US009580328B2

(12) United States Patent
Martinez et al.

(10) Patent No.: US 9,580,328 B2
(45) Date of Patent: *Feb. 28, 2017

(54) MESOPOROUS FRAMEWORK-MODIFIED ZEOLITES

(75) Inventors: Javier Garcia Martinez, Alicante (ES); Ernest Senderov, Westampton, NJ (US); Richard Hinchey, Blue Bell, PA (US)

(73) Assignee: Rive Technology, Inc., Monmouth Junction, NJ (US)

( * ) Notice: Subject to any disclaimer, the term of this patent is extended or adjusted under 35 U.S.C. 154(b) by 556 days.

This patent is subject to a terminal disclaimer.

(21) Appl. No.: 13/440,781

(22) Filed: Apr. 5, 2012

(65) Prior Publication Data

US 2012/0258852 A1 Oct. 11, 2012

Related U.S. Application Data

(60) Provisional application No. 61/473,588, filed on Apr. 8, 2011.

(51) Int. Cl.
| | |
|---|---|
| *B01J 29/06* | (2006.01) |
| *C01B 39/02* | (2006.01) |
| *B01J 29/04* | (2006.01) |
| *B01J 35/00* | (2006.01) |
| *B01J 37/00* | (2006.01) |
| *B01J 35/10* | (2006.01) |
| *B01J 29/08* | (2006.01) |
| *B01J 29/18* | (2006.01) |
| *B01J 29/40* | (2006.01) |
| *B01J 29/65* | (2006.01) |
| *B01J 29/70* | (2006.01) |

(52) U.S. Cl.
CPC ........... *C01B 39/026* (2013.01); *B01J 29/041* (2013.01); *B01J 35/002* (2013.01); *B01J 35/108* (2013.01); *B01J 35/1061* (2013.01); *B01J 37/0018* (2013.01); *B01J 29/08* (2013.01); *B01J 29/084* (2013.01); *B01J 29/18* (2013.01); *B01J 29/40* (2013.01); *B01J 29/65* (2013.01); *B01J 29/7003* (2013.01); *B01J 29/7007* (2013.01); *B01J 29/7015* (2013.01); *B01J 29/7034* (2013.01); *B01J 35/10* (2013.01); *B01J 35/109* (2013.01); *B01J 2229/16* (2013.01); *B01J 2229/36* (2013.01); *B01J 2229/37* (2013.01); *B01J 2229/38* (2013.01)

(58) Field of Classification Search
USPC ........... 502/60, 77, 78, 79, 85; 423/700, 716
See application file for complete search history.

(56) References Cited

U.S. PATENT DOCUMENTS

| | | |
|---|---|---|
| 3,709,853 A | 1/1973 | Karapinka |
| 3,864,280 A | 2/1975 | Schneider |
| 4,016,218 A | 4/1977 | Haag et al. |
| 4,088,671 A | 5/1978 | Kobylinski |
| 4,196,182 A | 4/1980 | Willermet et al. |
| 4,205,055 A | 5/1980 | Maire et al. |
| 4,263,268 A | 4/1981 | Knox et al. |
| 4,318,824 A | 3/1982 | Turner |
| 4,439,349 A | 3/1984 | Everett et al. |
| 4,564,207 A | 1/1986 | Russ et al. |
| 4,609,972 A | 9/1986 | Edeling et al. |
| 4,637,623 A | 1/1987 | Bubik |
| 4,689,314 A | 8/1987 | Martinez et al. |
| 4,704,375 A | 11/1987 | Martinez et al. |
| 4,761,272 A | 8/1988 | Hucke |
| 4,775,655 A | 10/1988 | Edwards et al. |
| 4,806,689 A | 2/1989 | Gier et al. |
| 4,816,135 A | 3/1989 | Martinez et al. |
| 4,836,737 A | 6/1989 | Holmes et al. |
| 4,840,930 A | 6/1989 | LaPierre et al. |
| 4,857,494 A | 8/1989 | Martinez et al. |
| 4,891,458 A | 1/1990 | Innes et al. |
| 4,894,215 A | 1/1990 | Kawakubo et al. |
| 4,894,354 A | 1/1990 | Martinez et al. |
| 4,968,405 A | 11/1990 | Wachter |
| 5,013,699 A | 5/1991 | Vassilakis et al. |
| 5,051,385 A | 9/1991 | Wachter |
| 5,057,296 A | 10/1991 | Beck |
| 5,061,147 A | 10/1991 | Nespor |
| 5,095,169 A | 3/1992 | Skeels et al. |
| 5,102,643 A | 4/1992 | Kresge et al. |
| 5,116,794 A | 5/1992 | Skeels et al. |
| 5,118,482 A * | 6/1992 | Narayana ............... B01J 20/186 423/713 |

(Continued)

FOREIGN PATENT DOCUMENTS

| | | |
|---|---|---|
| JP | 2004143026 | 5/2004 |
| WO | 95/07236 | 3/1995 |

(Continued)

OTHER PUBLICATIONS

Groen et al., "On the introduction of intracrystalline mesoporosity in zeolites upon desilication in alkaline medium", Microporous and Mesoporous Materials, 69, 2004, p. 29-34.*

Groen et al., "Decoupling mesoporosity formation and acidity modification in ZSM-5 zeolites by sequential desilication-dealumination", Microporous and Mesoporous Materials 87, p. 153-161, 2005.*

Extended European Search Report dated Oct. 2, 2014 for related European Patent Application No. 12768624.4, filed Apr. 5, 2012; 8 pages.

Sander Van Donk et al., Generation, Characterization, and Impact of Mesopores in Zeolite Catalysts, Catalysis Reviews: Science and Engineering, Marcel Dekker Inc., New York, US, vol. 45, No. 2, Jan. 1, 2003, pp. 297-319.

(Continued)

Primary Examiner — Elizabeth Wood
(74) Attorney, Agent, or Firm — Hovey Williams LLP

(57) ABSTRACT

Compositions and methods for preparing mesoporous and/or mesostructured materials from low Si/Al zeolites. Various embodiments described herein relate to preparation of mesoporous and/or mesostructured zeolites via a framework modification step followed by a mesopore introduction step.

51 Claims, 10 Drawing Sheets

(56) References Cited

U.S. PATENT DOCUMENTS

| | | |
|---|---|---|
| 5,134,242 A | 7/1992 | Le et al. |
| 5,134,243 A | 7/1992 | Bhore et al. |
| 5,160,033 A | 11/1992 | Vassilakis et al. |
| 5,200,058 A | 4/1993 | Beck et al. |
| 5,207,892 A | 5/1993 | Vassilakis et al. |
| 5,208,197 A | 5/1993 | Vassilakis et al. |
| 5,221,648 A | 6/1993 | Wachter |
| 5,232,580 A | 8/1993 | Le et al. |
| 5,254,327 A | 10/1993 | Martinez et al. |
| 5,256,277 A | 10/1993 | Del Rossi et al. |
| 5,258,570 A | 11/1993 | Skeels et al. |
| 5,260,501 A | 11/1993 | Bhore et al. |
| 5,288,393 A | 2/1994 | Jessup et al. |
| 5,308,475 A | 5/1994 | Degnan et al. |
| 5,344,553 A | 9/1994 | Shih |
| 5,347,060 A | 9/1994 | Hellring et al. |
| 5,360,774 A | 11/1994 | Martinez et al. |
| 5,387,246 A * | 2/1995 | Phillips ............... A61F 2/602 36/117.1 |
| 5,391,433 A | 2/1995 | Kawakubo et al. |
| 5,393,718 A | 2/1995 | Skeels et al. |
| 5,401,384 A | 3/1995 | Martinez et al. |
| 5,458,929 A | 10/1995 | Earls et al. |
| 5,510,431 A | 4/1996 | Earls et al. |
| 5,538,710 A | 7/1996 | Guo et al. |
| 5,601,798 A * | 2/1997 | Cooper ............... B01J 29/084 423/700 |
| 5,614,453 A | 3/1997 | Occelli |
| 5,628,978 A | 5/1997 | Tejada et al. |
| 5,636,437 A | 6/1997 | Kaschmitter et al. |
| 5,659,099 A | 8/1997 | Skeels et al. |
| 5,662,965 A | 9/1997 | Deguchi et al. |
| 5,672,556 A | 9/1997 | Pinnavaia et al. |
| 5,712,402 A | 1/1998 | Pinnavaia et al. |
| 5,744,673 A | 4/1998 | Skeels et al. |
| 5,770,040 A | 6/1998 | Tejada et al. |
| 5,785,946 A | 7/1998 | Pinnavaia et al. |
| 5,786,294 A | 7/1998 | Sachtler et al. |
| 5,795,559 A | 8/1998 | Pinnavaia et al. |
| 5,800,800 A | 9/1998 | Pinnavaia et al. |
| 5,800,801 A | 9/1998 | Tejada |
| 5,840,264 A | 11/1998 | Pinnavaia et al. |
| 5,840,271 A | 11/1998 | Carrazza et al. |
| 5,849,258 A | 12/1998 | Lujano et al. |
| 5,855,864 A | 1/1999 | Pinnavaia et al. |
| 5,858,457 A | 1/1999 | Brinker et al. |
| 5,892,080 A | 4/1999 | Alberti et al. |
| 5,902,564 A | 5/1999 | Lujano et al. |
| 5,952,257 A | 9/1999 | Tejada et al. |
| 5,958,367 A | 9/1999 | Ying et al. |
| 5,958,624 A | 9/1999 | Frech et al. |
| 5,961,817 A | 10/1999 | Wachter et al. |
| 5,985,356 A | 11/1999 | Schultz et al. |
| 5,993,768 A | 11/1999 | Zappelli et al. |
| 6,004,617 A | 12/1999 | Schultz et al. |
| 6,015,485 A | 1/2000 | Shukis et al. |
| 6,022,471 A | 2/2000 | Wachter et al. |
| 6,024,899 A | 2/2000 | Peng et al. |
| 6,027,706 A | 2/2000 | Pinnavaia et al. |
| 6,087,044 A | 7/2000 | Iwase et al. |
| 6,096,828 A | 8/2000 | DePorter et al. |
| 6,106,802 A | 8/2000 | Lujano et al. |
| 6,139,721 A | 10/2000 | Baldiraghi et al. |
| 6,162,414 A | 12/2000 | Pinnavaia et al. |
| 6,193,943 B1 | 2/2001 | Pinnavaia et al. |
| 6,204,424 B1 | 3/2001 | Yadav et al. |
| 6,248,691 B1 | 6/2001 | Gadkaree et al. |
| 6,297,293 B1 | 10/2001 | Bell et al. |
| 6,299,855 B1 | 10/2001 | Lujano et al. |
| 6,319,872 B1 | 11/2001 | Manzer et al. |
| 6,334,988 B1 | 1/2002 | Gallis et al. |
| 6,391,278 B1 | 5/2002 | Pinnavaia et al. |
| 6,410,473 B1 | 6/2002 | Pinnavaia et al. |
| 6,413,489 B1 | 7/2002 | Ying et al. |
| 6,413,902 B1 | 7/2002 | Pinnavaia et al. |
| 6,419,820 B1 | 7/2002 | Bogdan et al. |
| 6,476,085 B2 | 11/2002 | Manzer et al. |
| 6,476,275 B2 | 11/2002 | Schmidt et al. |
| 6,485,702 B1 | 11/2002 | Lujano et al. |
| 6,489,168 B1 | 12/2002 | Wang et al. |
| 6,495,487 B1 | 12/2002 | Bogdan |
| 6,515,845 B1 | 2/2003 | Oh et al. |
| 6,524,470 B1 | 2/2003 | Kasztelan et al. |
| 6,538,169 B1 | 3/2003 | Pittman et al. |
| 6,541,539 B1 | 4/2003 | Yang et al. |
| 6,544,923 B1 | 4/2003 | Ying et al. |
| 6,548,440 B1 | 4/2003 | Pham et al. |
| 6,558,647 B2 | 5/2003 | Lacombe et al. |
| 6,580,003 B2 | 6/2003 | Deng et al. |
| 6,583,186 B2 | 6/2003 | Moore, Jr. |
| 6,585,948 B1 | 7/2003 | Ryoo et al. |
| 6,585,952 B1 | 7/2003 | Pinnavaia et al. |
| 6,592,764 B1 | 7/2003 | Stucky et al. |
| 6,620,402 B2 | 9/2003 | Jacobsen et al. |
| 6,623,967 B1 | 9/2003 | Willson, III |
| 6,649,413 B1 | 11/2003 | Schultz et al. |
| 6,656,443 B2 | 12/2003 | Klett |
| 6,669,924 B1 | 12/2003 | Kaliaguine et al. |
| 6,689,336 B2 | 2/2004 | Kanno |
| 6,702,993 B2 | 3/2004 | Pinnavaia et al. |
| 6,706,169 B2 | 3/2004 | Pinnavaia et al. |
| 6,706,659 B2 | 3/2004 | Gillespie et al. |
| 6,710,003 B2 | 3/2004 | Jan et al. |
| 6,746,659 B2 | 6/2004 | Pinnavaia et al. |
| 6,756,515 B2 | 6/2004 | Rende et al. |
| 6,762,143 B2 | 7/2004 | Shan et al. |
| 6,770,258 B2 | 8/2004 | Pinnavaia et al. |
| 6,793,911 B2 | 9/2004 | Koegler et al. |
| 6,797,153 B1 | 9/2004 | Fukuyama et al. |
| 6,797,155 B1 | 9/2004 | Chester et al. |
| 6,800,266 B2 | 10/2004 | Pinnavaia et al. |
| 6,809,061 B2 | 10/2004 | Bogdan et al. |
| 6,811,684 B2 | 11/2004 | Mohr et al. |
| 6,814,943 B2 | 11/2004 | Radcliffe et al. |
| 6,818,589 B1 | 11/2004 | Gillespie |
| 6,833,012 B2 | 12/2004 | Rogers |
| 6,841,143 B2 | 1/2005 | Inagaki et al. |
| 6,843,906 B1 | 1/2005 | Eng |
| 6,843,977 B2 | 1/2005 | Pinnavaia et al. |
| 6,846,546 B2 | 1/2005 | Kuroda et al. |
| 6,866,925 B1 | 3/2005 | Chane-Ching |
| 6,869,906 B2 | 3/2005 | Pinnavaia et al. |
| 6,936,234 B2 | 8/2005 | Bilenko |
| 6,998,104 B2 | 2/2006 | Tao et al. |
| 7,084,087 B2 | 8/2006 | Shan et al. |
| 7,589,041 B2 | 9/2009 | Ying et al. |
| 7,807,132 B2 | 10/2010 | Garcia-Martinez |
| 7,976,696 B2 | 7/2011 | Ying et al. |
| 8,007,663 B2 | 8/2011 | Ying et al. |
| 8,008,223 B2 | 8/2011 | Garcia-Martinez |
| 8,641,889 B2 * | 2/2014 | Simon et al. ............... 208/110 |
| 8,969,233 B2 * | 3/2015 | Simon ............... B01J 29/084 502/60 |
| 2001/0031241 A1 | 10/2001 | Lacombe et al. |
| 2001/0042440 A1 | 11/2001 | Miyazawa et al. |
| 2003/0054954 A1 | 3/2003 | Chane-Ching et al. |
| 2004/0067842 A1 | 4/2004 | Pinnavaia et al. |
| 2004/0138051 A1 | 7/2004 | Shan et al. |
| 2004/0179996 A1 | 9/2004 | Shan et al. |
| 2005/0074396 A1 | 4/2005 | Takahashi et al. |
| 2005/0130827 A1 | 6/2005 | Schunk |
| 2005/0214539 A1 | 9/2005 | Ying et al. |
| 2006/0078487 A1 | 4/2006 | Endo et al. |
| 2006/0134219 A1 | 6/2006 | Martens et al. |
| 2006/0264318 A1 | 11/2006 | Shan et al. |
| 2007/0227351 A1 | 10/2007 | Garcia-Martinez |
| 2007/0244347 A1 | 10/2007 | Ying et al. |
| 2008/0138274 A1 | 6/2008 | Garcia-Martinez |
| 2009/0110631 A1 | 4/2009 | Garcia-Martinez |
| 2010/0098623 A1 | 4/2010 | Gagea et al. |
| 2010/0190632 A1 | 7/2010 | Dight |
| 2010/0196263 A1 | 8/2010 | Garcia-Martinez |

(56) References Cited

U.S. PATENT DOCUMENTS

| | | | |
|---|---|---|---|
| 2010/0311856 | A1 | 12/2010 | Chmelka et al. |
| 2011/0118107 | A1 | 5/2011 | Garcia-Martinez |
| 2011/0171121 | A1 | 7/2011 | Senderov |

FOREIGN PATENT DOCUMENTS

| | | |
|---|---|---|
| WO | 2001017901 | 3/2001 |
| WO | 0138223 | 5/2001 |
| WO | 2005102964 | 11/2005 |
| WO | 2006031259 | 3/2006 |
| WO | 2006/038912 | 4/2006 |
| WO | 2010/072976 | 7/2010 |
| WO | 2010/083488 | 7/2010 |
| WO | 2011/002630 A2 | 1/2011 |

OTHER PUBLICATIONS

International Search Report and Written Opinion for PCT Patent Application No. PCT/US2012/032400, filed Apr. 5, 2012; Mailed: Dec. 27, 2012; 12 pages.
Notice of Acceptance dated Jun. 1, 2015 from corresponding Australian Patent Application No. 2012240093, filed Apr. 5, 2012, 2 pages.
Al-Khattaf, S. et al., The Role of Diffusion in Alkyl-Benzenes Catalytic Cracking, Appl. Catal. A: Gen. 226; 139-153, (2002).
Bagri, R. et al.; Catalytic Pyrolysis of Polyethylene; Anal. Pyrolysis, 63:29-41 (2002).
Conway, B.E., Electrochemical Supercapacitors, Kluwer Academic/Plenum Publishers, New York, 1999, pp. 11-22, 51-63, 125-135, 183-219, 221-224, 255, 335-338, 337-415, 417-440, 598, 602, 615, and 649-666.
Corma, A., From Microporous to Mesoporous Molecular Sieve Materials and Their Use in Catalysis, Chem. Rev., 97:2373-2419, (1997).
CSIC NM014—Method of Preparation of Mesoporous Alumina with High Thermal Stability, http://www.serina.es/escaparate/verproducto.cgi?idproducto=4980&refcompra=NULO, downloaded May 9, 2007, 2 pages.
Davis, M.E., Ordered Porous Materials for Emerging Applications, Nature, 417:813-821 (2002).
Davis, M.E., Zeolite and Molecular Sieve Synthesis, Chem. Mater., 4:756-768 (1992).
De Moor, P-P.E.A. et al., Imaging the Assembly Process of the Organic-Mediated Synthesis of a Zeolite, Chem. Eur. J., 5(7):2083-2088 (1999).
Degnan, T.F. et al., History of ZSM-5 Fluid Catalytic Cracking Additive Development at Mobile, Microporous Mesoporous Mater, 35-36:245-252 (2000).
De A.A. Soler-Illia, Galo, J. et al., Chemical Strategies to Design Textured Materials from Microporous and mesoporous Oxides to Nanonetworks and Hierarchial Structures, Chem. Rev. 102:4093-4138 (2002).
Galo, J. de A. A. et al., Chemical Strategies to Design Textured Materials: from Microporous and Mesoporous Oxides to Nanonetworks and Hierarchical Structures, Chern. Rev., 2002, 102, 4093-4138.
Geidel, E. et al., Characterization of Mesoporous Materials by Vibrational Spectroscopic Techniques, Microporous and Mesoporous Mater., 65:31-42 (2003).
Gonzalez-Pena, V. et al., Thermally Stable Mesoporous Alumina Synthesized with Non-ionic Surfaces in teh Presence of Amines, Microporous and Mesoporous Materials, 44 45, pp. 203-210 (2001).
Goto, Y., Mesoporous Material from Zeolite, Journal of Porous Materials, 9, 2002, pp. 43-48.
Grieken, Rafael et al., Supercritical Fluid Extraction of a Nonionic Surfactant Template from SBA-15 Materials and Consequences on the Porous Structure, Langmuir 2003, 19, 3966-3973, American Chemical Society, Rey Juan Carlos University, Madrid, Spain, University of California, Santa Barbara, California.

Grudzien, Rafal M. et al., Effective Method for Removal of Polymeric Template from SBA-16 Silica Combining Extraction and Temperaure-controlled Calcination, The Royal Society of Chemistry, 2006, J. Mater. Chem., 2006, 16, 819-823.
Harding, R.H. et al., New Developments in FCC Catalyst Technology, Appl. Catal. A:Gen. 221:389-396 (2001).
Huang, L. et al., Investigation of Synthesizing MCM-41/ZSM Composites, J. Phys. Chem. B. 104:2817-2823 (2000).
Iijima, S., Carbon Nanotubes: Past, Present, and Future, Physica B: Condensed Matter, www.elsevier.com/locate/physb, 2002, 323, pp. 1-5.
International Search Report and Written Opinion dated Nov. 7, 2005 from International Patent Application No. PCT/US2005/05918, filed Feb. 25, 2005.
Joo, S.H., et al., Ordered Nanoporous Arrays of Carbon Supporting High Dispersions of Platinum Nanoparticles, Letters to Nature, www.nature.com, Macmillan Magazines Ltd., Nature, vol. 412, Jul. 12, 2001, pp. 169-172.
Karlsson A. et al., Composites of Micro- and Mesoporous Materials: Simultaneous Syntheses of MFI/MCM-41 Like Phases by a Mixed Template Approach, Microporous and mesoporous Mater, 27: 181-192 (1999).
Kloestra, K.R. et al., Mesoporous Material Containing Framework Tectosilicate by Pore-Wall Recrystallization, Chem. Commun., 23:2281-2282 (1997).
Kyotani, T., Control of Pore Structure in Carbon, Carbon, Institute for Chemical Reaction Science, Tohoku University, 2-1-1, Kaiahira, Sendai 980-8577, Japan, Jun. 1, 1999, ElSevier Science Ltd., pp. 269-286.
Lee, H. et al., Materials Science: On the Synthesis of Zeolites, ScienceWeek, downloaded from http://www.scienceweek.com/2003/sa031031-1.htm on Apr. 23, 2005, 5 pages.
Lin, C. et al., Carbonization and Activation of Sol-gel Derived Carbon Xerogels, Carbon, Department of Chemical Engineering, University of South Carolina, Colombia, SC, Aug. 2, 1999, Elsevier Science Ltd., pp. 849-861.
Linssen, T. et al., Mesoporous Templated Silicates: An Overview of Their Synthesis, Catalytic Activation and Evaluation of the Stability, Advances in Colloid and Interface Science, 103:121-147 (2003).
Liu, Y. et al., Steam-Stable MSU-S Aluminosilicate Mesostructures Assembled from Zeolite ZSM-5 and Zeolite Beta Seeds, Angew. Chem. Int. Ed., 7:1255-1258 (2001).
Liu, Y. et al.,Aluminosilicate Mesostructures with Improved Acidity and Hydrothermal Stability, J. Mater. Chem., 12:3179-3190 (2002).
Lyons, D.M. et al., Preparation of Ordered Mesoporous Ceria with Enhanced Thermal Stability, The Journal of Materials Chemistry, vol. 12, pp. 1207-1212 (2002).
Mendes, M.F. et al., Optimization of the Process of Concentration of Vitamin E from DDSO using Supercritical $CO_2$, Brazilian Journal of Chemical Engineering, vol. 22, No. 01, pp. 83-91, Jan.-Mar. 2005.
Moller, K. et al., Synthesis of Ordered Mesoporous Methacrylate Hybrid Systems: Hosts for Molecular Polymer Composites, Department of Chemistry, Purdue University, West Lafayette, IN, American Chemical Society, Dec. 28, 1998, pp. 665-673.
Ogura, M. et al., Formation of Uniform Mesopores in ZSM-5 Zeolite through Treatment in Alkaline Solution, Chemistry Letters 2000, pp. 882-883.
On, D.T. et al., Large-Pore Mesoporous Materials with Semi-Crystalline Zeolitic Frameworks, Angew. Chem. Int. Ed., 17:3248-3251 (2001).
Park, D.W. et al., Catalytic Degration of Polyethylene Over Solid Acid Catalysts, Polym. Degrad. Stabil., 65:193-198 (1999).
Patarin, J. et al., Mild Methods for Removing Organic Templates from Inorganic Host Materials, Highlights, Angew. Chem. Int. Ed. 2004, 43:3878-3880.
Prokesova, P. et al., Preparation of Nanosized Micro/Mesoporous Composites via Simultaneous Synthesis of Beta/MCM-48 Phases, Microporous and Mesoporous Materials 64 (2003) pp. 165-174.
RYoo, R. et al., Synthesis of Highly Ordered Carbon Molecular Sieves via Template-Mediated Structural Transformation, The Journal of Physical Chemistry B, vol. 103, No. 38, Sep. 16, 1999, pp. 7743-7746.

(56) References Cited

OTHER PUBLICATIONS

Scherzer, J. et al., Octane-Enhancing Zeolitic FCC Catalysts—Scientific and Technical Aspects, Marcel Dekker, Inc., 42 pages, (1990).
Storck, S. et al., Characterization of Micro- and Mesoporous Solids by Physisorption Methods and Pore-Size Analysis, Applied Catalysts A: Gen. 17:137-146 (1998).
Tao et al., Mesopore-Modified Zeolites: Preparation, Characterization, and Applications, Chem. Rev., vol. 106, pp. 896-910 (2006).
Triantafyllidis K.S. et al., Gas-oil Cracking Activity of Hydrothermally Stable Aluminosilicate Mesostructures (MSU-S) Assembled from Zeolite Seeds: Effect of the Type of Framework Structure and Porosity, Catalyst Today, vol. 112, pp. 33-36 (2006).
Verhoef, M. J. et al., Partial Transformation of MCM-41 Material into Zeolites: Formation of Nanosized MFI Type Crystallites, Chemical Materials, 2001, vol. 13, pp. 683-687.
Yang, P. et al., Generalized Syntheses of Large-Pore Mesoporous Metal Oxides with Semicrystalline Frameworks, Nature, vol. 396, Nov. 12, 1998, pp. 152-155; www.nature.com.
Ying, J. Y. et al., Synthesis and Applications of Supramolecular-Templated Mesoporous Materials, Angew. Chem. Int. Ed., 38:56-77 (1999).
Zhang, Z. et al, Mesoporous Aluminosilicates with Ordered Hexagonal Structure, Strong Acidity, and Extraordinary Hydrothermal Stability at High Temperatures, J. of the American Chem. Society, 2001, vol. 123, pp. 5014-5021.
Poladi, Raja H.P.R. et al., Synthesis, Characterization, and Catalytic Properties of a Microporous/Mesoporous Material, MMM-1, Journal of Solid State Chemistry, 2002, vol. 167, pp. 363-369.
Xia, Yongde et al., On the synthesis and characterization of ZSM-5/MCM-48 aluminosilicate composite materials, Journal of the Royal Society of Chemistry, 2004, pp. 863-870.
Guo et al., Characterization of Beta/MCM-41 Composite Molecular Sieve Compared with the Mechanical Mixture Microporous and Mesoporous Materials, vols. 44-45; pp. 427-434, 2001.
Tao et al., ZSM-5 Monolith of Uniform Mesoporous Channels, Material Sciences, Chiba University, J. Am. Chem. Soc., Japan 2003, pp. 6044-6045.

* cited by examiner

US 9,580,328 B2

MESOPOROUS FRAMEWORK-MODIFIED ZEOLITES

RELATED APPLICATIONS

This application claims priority benefit under 35 U.S.C. Section 119(e) to U.S. Provisional Patent Ser. No. 61/473,488, filed Apr. 8, 2011, the entire disclosure of which is incorporated herein by reference.

BACKGROUND

1. Field

One or more embodiments of the invention relate to compositions and methods for preparing mesoporous and/or mesostructured materials from low Si/Al zeolites. More particularly, embodiments described herein relate to preparation of mesoporous and/or mesostructured zeolites via a framework modification step followed by a mesopore introduction step.

2. Description of Related Art

Previously, methods have been described to introduce mesoporosity into zeolites, for example, in U.S. Patent Application Publication No. 2007/0244347. These zeolites, namely CBV 720 provided by Zeolyst International, have a high silicon-to-aluminum ratio ("Si/Al") and a low non-framework aluminum content. As previously described, this zeolite can be treated in the presence of a pore forming agent (e.g., a surfactant) at a controlled pH under a set of certain time and temperature conditions to introduce mesoporosity into the zeolite. Thereafter, the mesostructured material can be treated to remove the pore forming agent (e.g., by calcination or chemical extraction). Although advances have been made in the art of introducing mesoporosity into zeolites, improvements are still needed.

SUMMARY

One embodiment of the present invention concerns a method of forming a material comprising at least one mesoporous zeolite. The method generally comprises: (a) subjecting an initial zeolite to a framework modification process thereby producing a framework-modified zeolite; and (b) forming a plurality of mesopores in at least a portion of the framework-modified zeolite thereby forming the mesoporous zeolite. The initial zeolite has a framework silicon-to-aluminum ratio ("Si/Al") of less than 30 and the framework-modified zeolite has a crystalline content that is less than the crystalline content of the initial zeolite as measured by X-ray diffraction ("XRD").

Another embodiment of the present invention concerns a method of forming a material comprising at least one desilicated mesoporous zeolite. Generally, the method comprises: (a) contacting an initial zeolite with an acid thereby forming an acid-pretreated zeolite; and (b) contacting at least a portion of the acid-pretreated zeolite with a base to at least partially desilicate the acid-pretreated zeolite to thereby produce the desilicated mesoporous zeolite. The initial zeolite has a framework silicon-to-aluminum ratio ("Si/Al") of less than 30.

Still another embodiment of the present invention concerns a method of forming a mesoporous material. The method comprises (a) subjecting an initial zeolite to a framework modification process to thereby produce a framework-modified zeolite; and (b) forming a plurality of mesopores in at least a portion of the framework-modified zeolite to thereby form the mesoporous material. The initial zeolite has a framework silicon-to-aluminum ratio ("Si/Al") of less than 30 and the mesoporous material has a crystalline content that is at least 90 percent less than the crystalline content of the initial zeolite as measured by X-ray diffraction ("XRD").

Yet another embodiment of the present invention concerns a zeolitic material that comprises: a zeolite having a framework silicon-to-aluminum ratio ("Si/Al") of less than 30, a total 20 to 80 Å diameter mesopore volume of at least 0.05 cc/g, and a crystalline content of less than 10 weight percent as measured by X-ray diffraction ("XRD").

Still yet another embodiment of the present invention concerns a zeolitic material that comprises: a zeolite having a framework silicon-to-aluminum ratio ("Si/Al") of less than 30, a total 20 to 80 Å diameter mesopore volume of at least 0.05 cc/g, and a crystalline content of at least 20 weight percent as measured by X-ray diffraction ("XRD").

BRIEF DESCRIPTION OF THE DRAWING FIGURES

Embodiments of the present invention are described herein with reference to the following drawing figures, wherein:

FIG. 1 is a plot of micropore volume versus mesopore volume for samples prepared in Example 1;

FIG. 2 presents X-ray diffraction characteristic variations with progression of transformation of the samples prepared in Example 1;

Figure 5A:
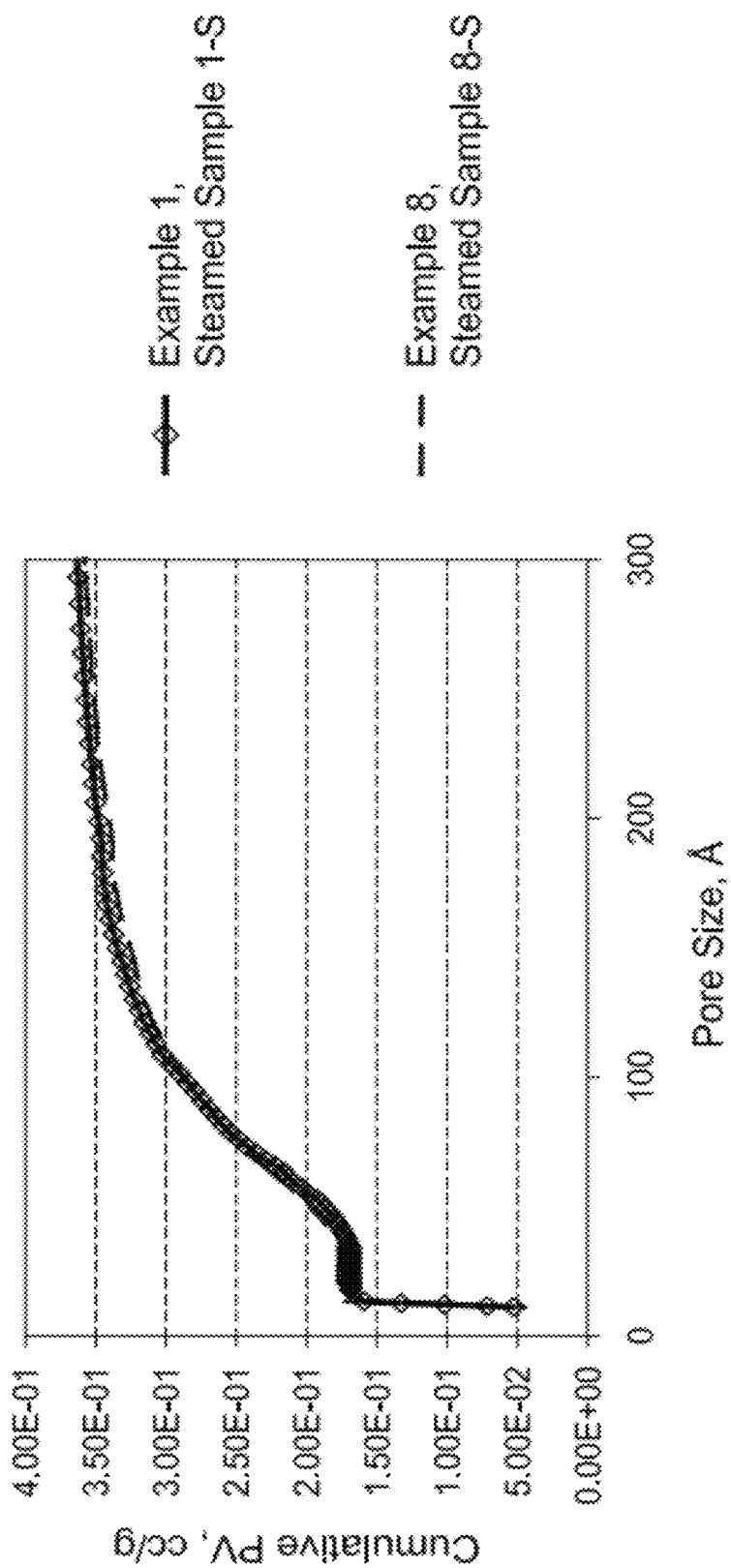
Figure 5B:
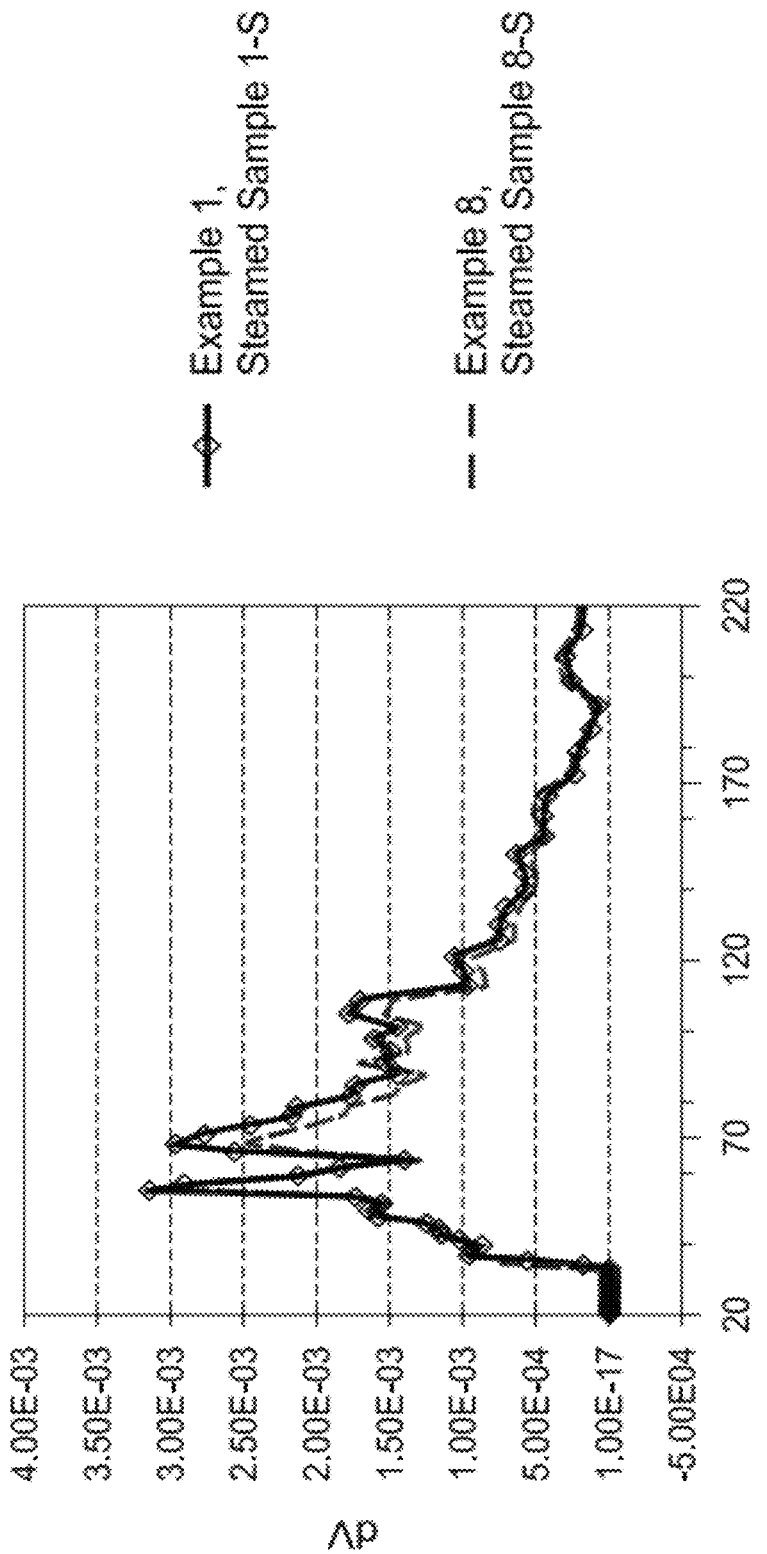
Figure 6:
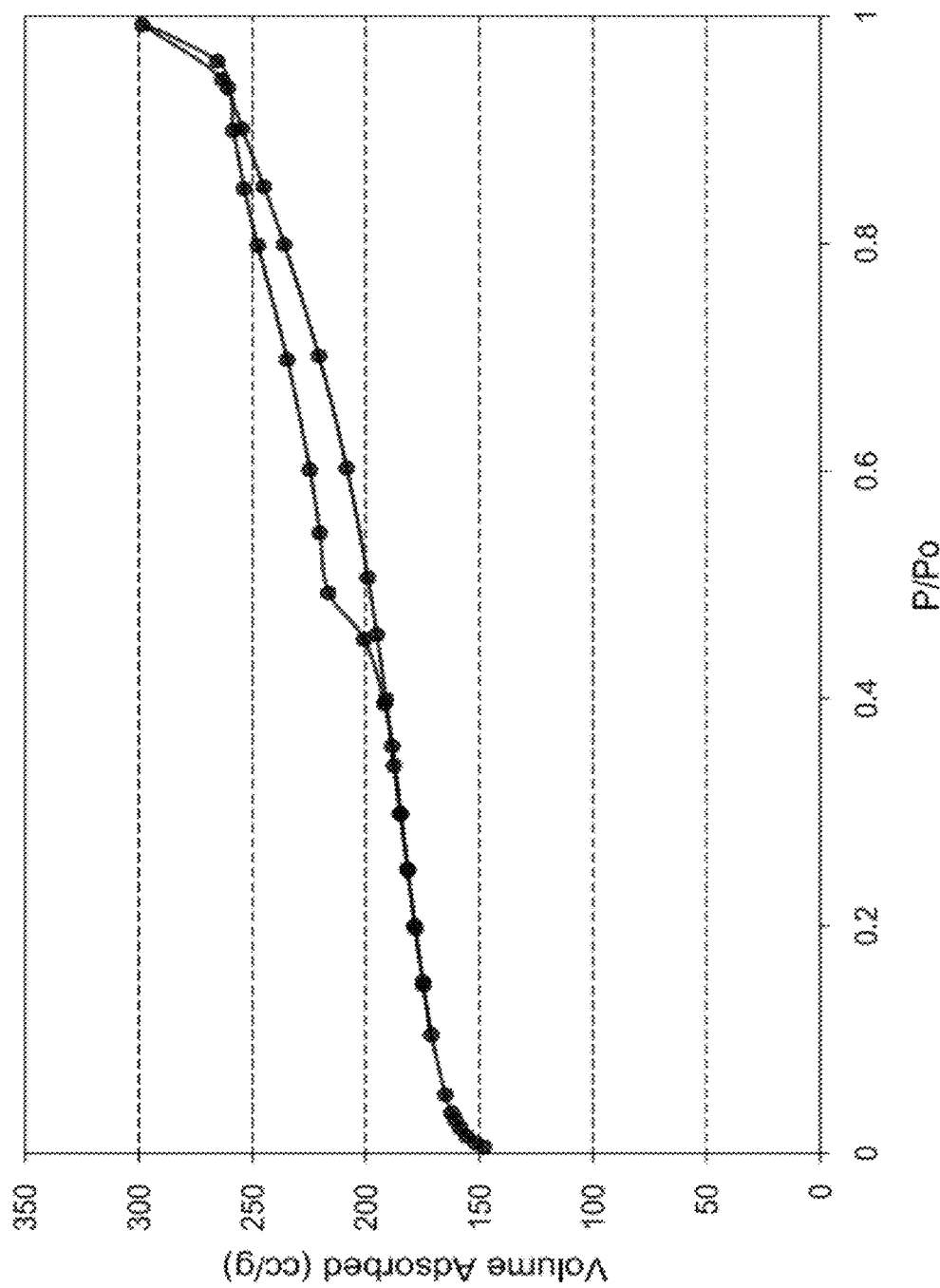
Figure 8:
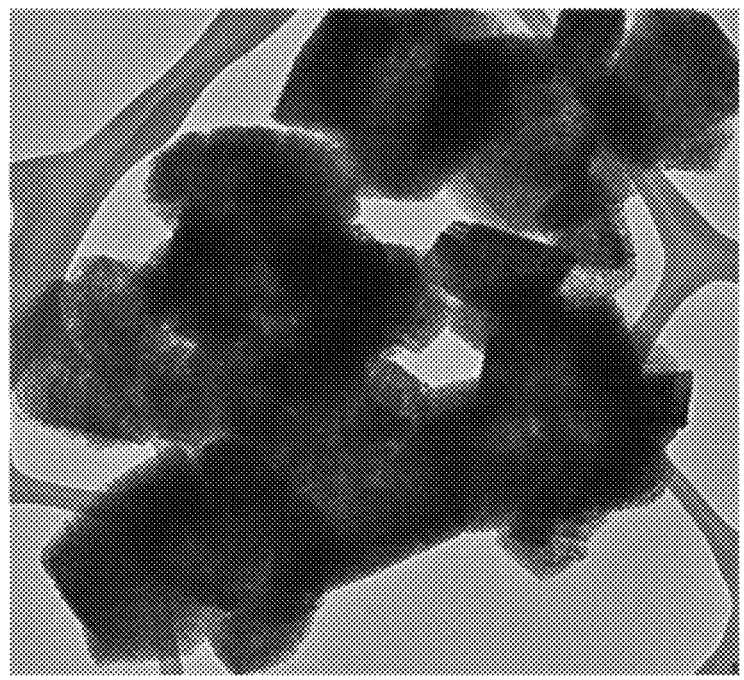
Figure 7:
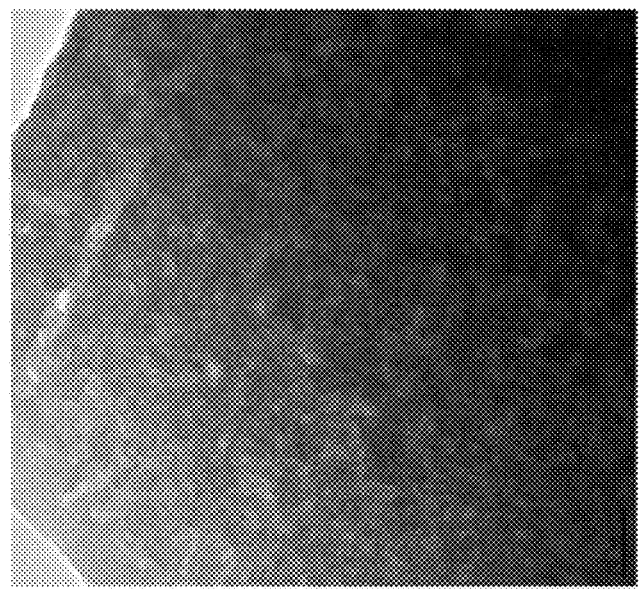
Figure 9:
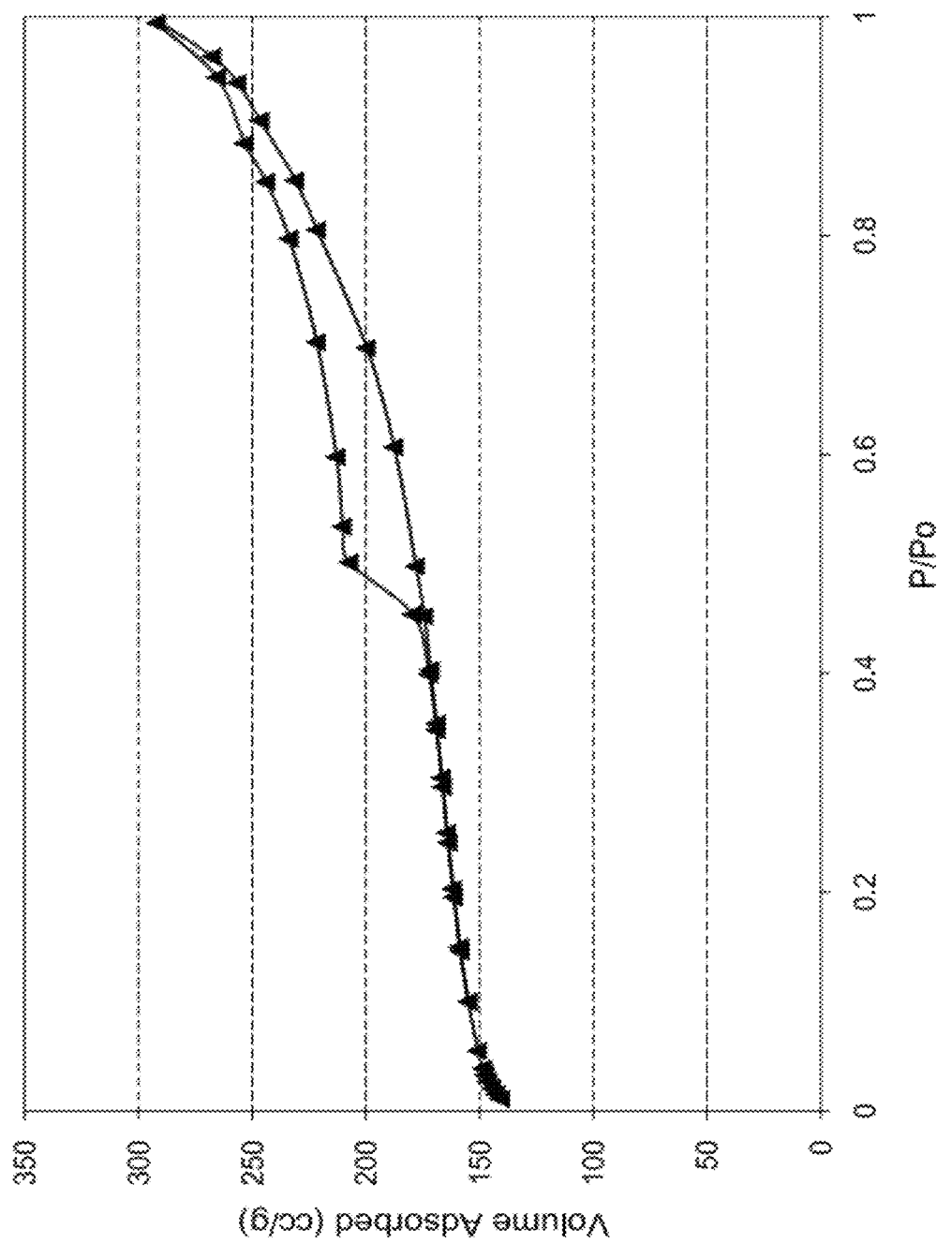
Figure 10:
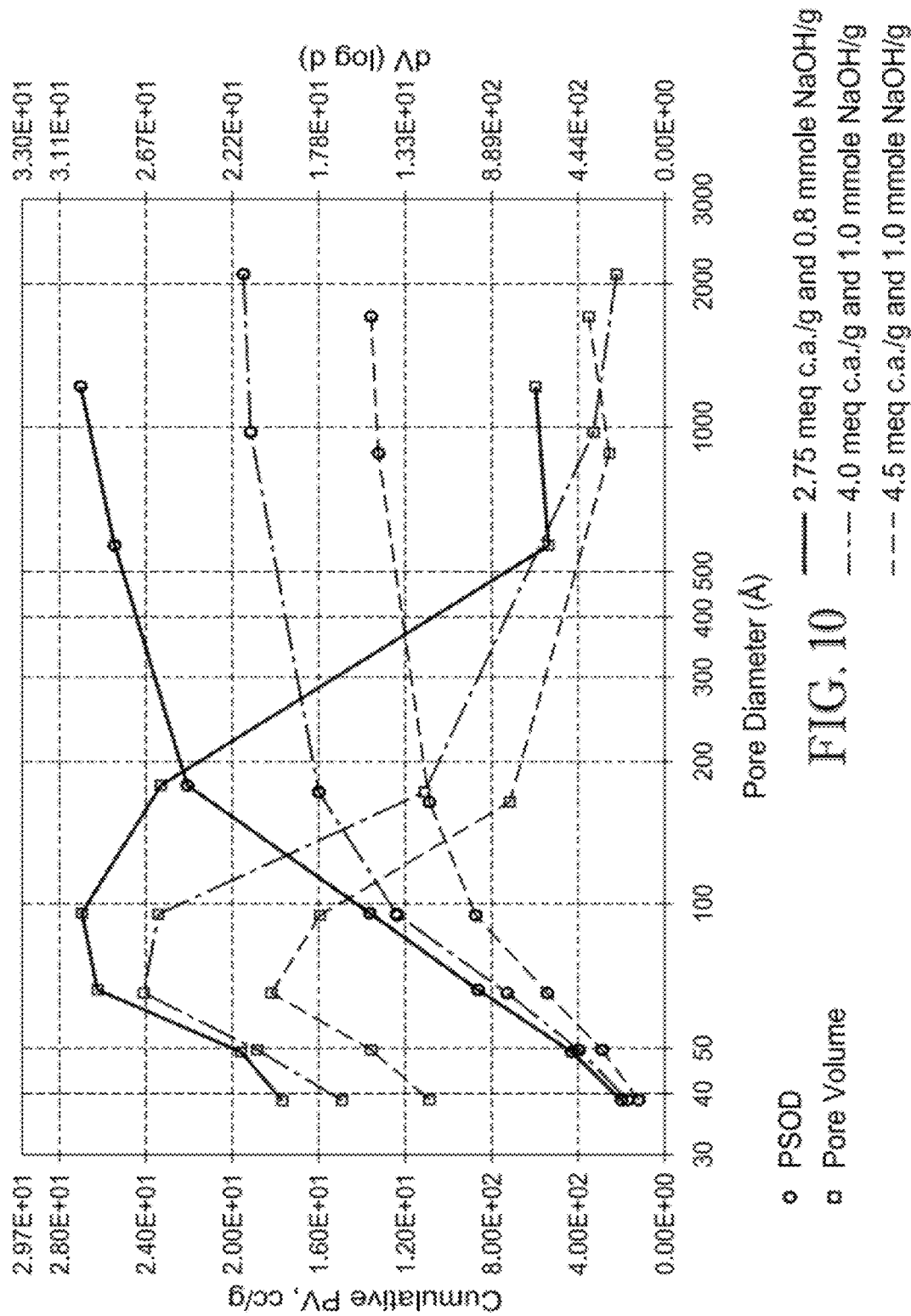

FIGS. 5a and 5b present DFT plots comparing the cumulative pore volumes and the mesoporosity in the products from surfactant-free and surfactant-assisted riving;

FIG. 6 is the nitrogen absorption isotherm of the sample prepared in Example 10;

FIG. 7 is a high magnification transmission electron microscopy ("TEM") micrograph of the sample prepared in Example 10;

FIG. 8 is a lower magnification TEM micrograph of the sample prepared in Example 10;

FIG. 9 is the nitrogen absorption isotherm of the sample prepared in Example 11; and FIG. 10 is a graph showing the effects of acid concentration used during the acid treatment of the initial zeolites on pore volumes and pore-size-distribution ("PSOD").

DETAILED DESCRIPTION

Various embodiments of the present invention concern methods for preparing a material containing a mesoporous zeolite. In one or more embodiments, the mesoporous zeolite can be prepared by first subjecting an initial zeolite to a framework modification process and thereafter forming a plurality of mesopores in the resulting framework-modified zeolite.

As just mentioned, an initial zeolite is employed as a starting material in preparing a mesoporous zeolite. In one or more embodiments, the initial zeolite starting materials can have a total 20 to 80 Å diameter mesopore volume of less than 0.01 cc/g. Additionally, suitable initial zeolites can have a total 1 to 20 Å micropore volume of at least 3.0 cc/g. Furthermore, the initial zeolite can have an average unit cell size ("UCS") of at least 24.40, at least 24.45, or at least 24.50 Å. In certain embodiments, the initial zeolite has not been previously subjected to any forms of pretreatment including, for example, steam treatment, thermal treatment, dealumination, and/or desilication. Additionally, in various embodiments, the initial zeolite can be present as a component of a composite material. Such composite materials can further include, for example, one or more binder material components.

In various embodiments, the initial zeolite can have a low framework silicon-to-aluminum ratio ("Si/Al"). For example, the initial zeolite can have a framework Si/Al ratio of less than 30, less than 25, less than 20, less than 15, less than 10, or less than 5. Additionally, the initial zeolite can have a framework Si/Al ratio in the range of from about 1 to about 30, in the range of from about 2 to about 25, or in the range of from 5 to 20. Note that, as used herein, the "framework silicon-to-aluminum ratio" refers to the elemental ratio (i.e., silicon atoms to aluminum atoms) of the zeolite; this is in contrast to another commonly used parameter, the silica-to-alumina ratio (i.e., $SiO_2/Al_2O_3$) of the zeolite. Generally, the Si/Al of a zeolite can be determined via bulk chemical analysis. This method, however, does not distinguish between the tetrahedrally-coordinated framework aluminum atoms and non-framework aluminum ("NFA") atoms in the zeolite. As will be understood to those of ordinary skill in the art, the framework Si/Al can be determined by a combination of methods, such as using both bulk chemical analysis and aluminum-27 nuclear magnetic resonance ("$^{27}$Al NMR") and/or silicon-29 nuclear magnetic resonance ("$^{29}$Si NMR"). In various embodiments described herein, the framework Si/Al can be determined by known methods in the art. For example, a combination of bulk chemical analysis and $^{27}$Al NMR can be employed for determining the framework Si/Al of the zeolite.

In various embodiments, the initial zeolite can have a 1-dimensional, 2-dimensional, or 3-dimensional pore structure. Additionally, the initial zeolite can exhibit long-range crystallinity. Materials with long-range crystallinity include all solids with one or more phases having repeating structures, referred to as unit cells, that repeat in a space for at least 10 nm. Furthermore, in various embodiments, the initial zeolite can be fully crystalline. Additionally, the initial zeolite can be a one-phase hybrid material.

The type of zeolite suitable for use as the initial zeolite is not particularly limited. However, in one or more embodiments, the initial zeolite can be selected from the group consisting of zeolite A, faujasite (i.e., zeolites X and Y; "FAU"), mordenite ("MOR"), CHA, ZSM-5 ("MFI"), ZSM-12, ZSM-22, beta zeolite, synthetic ferrierite ("ZSM-35"), synthetic mordenite, and mixtures of two or more thereof. In further embodiments, the initial zeolite can be a Y zeolite (i.e., faujasite) selected from the group consisting of USY, $NH_4Y$, NaY, a rare earth ion zeolite Y, and mixtures of two or more thereof. Specific examples of commercially-available Y zeolites suitable for use include, but are not limited to, USY CBV 500, NaY CBV 100, and $NH_4Y$ CBV 300, available from Zeolyst International.

As noted above, the initial zeolite can initially be subjected to a framework modification process. In various embodiments, the framework modification process can be any process that sufficiently compromises the integrity of the zeolite framework so that it becomes responsive to mesopore creation. In such embodiments, the initial zeolite would not be responsive to mesopore creation prior to the framework modification process. In general, compromising the framework reduces the crystallinity of the initial zeolite in order to produce a framework-modified zeolite having a lower apparent crystalline content. In one or more embodiments, the framework modification process can be sufficient to reduce the crystalline content of the initial zeolite by at least 1, at least 5, at least 10, at least 15, at least 20, at least 25, at least 30, at least 35, or at least 40 percent. As would be understood by one of ordinary skill in the art, the crystalline content of a zeolite can be measured by X-ray diffraction ("XRD") and is typically expressed in terms of weight percent of the tested material. Thus, in various embodiments, the difference in crystalline content between the initial zeolite and the framework-modified zeolite can be determined by XRD. Methods for determining the crystalline content of a zeolite are generally known to those of ordinary skill in the art. Accordingly, in one or more embodiments, the framework-modified zeolite can have a crystalline content that is less than the crystalline content of the initial zeolite, such as, for example, at least 1, at least 5, at least 10, at least 15, at least 20, at least 25, at least 30, at least 35, or at least 40 percent less than the crystalline content of said initial zeolite as measured by XRD. In further embodiments, the framework-modified zeolite can have a reduced crystalline content that is within 50 percent, within 45 percent, within 40 percent, within 35 percent, within 30 percent, within 25 percent, within 20 percent, within 15 percent, or within 10 percent of the initial zeolite. In certain other embodiments, the framework modification process can be selected so as to reduce the crystalline content of the initial zeolite by at least 90, at least 95, or at least 99 percent. In particular embodiments, the resulting framework-modified zeolite can have no or substantially no crystalline content as measured by X-ray diffraction (i.e., X-ray diffraction amorphous).

In additional or alternate embodiments, the framework modification process can increase the framework Si/Al of the initial zeolite. Thus, in various embodiments, the framework-modified zeolite can have a framework Si/Al that is at least 1, at least 2, at least 5, at least 10, at least 20, at least 30, at least 40, at least 50, at least 60, at least 70, at least 80, at least 90, or at least 100 percent greater than the framework Si/Al of the initial zeolite as measured by $^{27}$Al NMR. In further embodiments, the framework-modified zeolite can have a framework Si/Al that is in the range of from about 1 to about 100 percent greater than the framework Si/Al of the initial zeolite, in the range of from about 1 to about 90 percent greater than the framework Si/Al of the initial zeolite, in the range of from about 1 to about 80 percent greater than the framework Si/Al of the initial zeolite, in the range of from about 1 to about 70 percent greater than the framework Si/Al of the initial zeolite, in the range of from about 1 to about 60 percent greater than the framework Si/Al of the initial zeolite, in the range of from about 1 to about 50 percent greater than the framework Si/Al of the initial zeolite, in the range of from about 1 to about 40 percent greater than the framework Si/Al of the initial zeolite, in the range of from about 1 to about 30 percent greater than the framework Si/Al of the initial zeolite, in the range of from about 1 to about 20 percent greater than the framework Si/Al of the initial zeolite, in the range of from about 1 to about 10 percent greater than the framework Si/Al of the initial zeolite, in the range of from about 1 to about 5 percent greater than the framework Si/Al of the initial zeolite, or in the range of from about 1 to about 2 percent greater than the framework Si/Al of the initial zeolite, as measured by $^{27}$Al NMR. In still further embodiments, the framework-modified zeolite can have a framework Si/Al that is less than 100 percent greater than the framework Si/Al of the initial zeolite, less than 90 percent greater than the framework Si/Al of the initial zeolite, less than 80 percent greater than the framework Si/Al of the initial zeolite, less than 70 percent greater than the framework Si/Al of the initial zeolite, less than 60 percent greater than the framework Si/Al of the initial zeolite, less than 50 percent greater than the framework Si/Al of the initial zeolite, less than 40 percent greater than the framework Si/Al of the initial zeolite, less than 30 percent greater than the framework Si/Al of the initial zeolite, less than 20 percent greater than the framework Si/Al of the initial zeolite, less than 10 percent greater than the framework Si/Al of the initial zeolite, less than 5 percent greater than the framework Si/Al of the initial zeolite, or less than 2 percent greater than the framework Si/Al of the initial zeolite, as measured by $^{27}Al$ NMR.

In various embodiments, the framework-modified zeolite can have a fewer number of Si—O—Al bonds in its zeolite framework than the initial zeolite. In various embodiments, the framework-modified zeolite can have at least 0.1, at least 1, at least 5, or at least 10 percent fewer Si—O—Al bonds than the initial zeolite. Furthermore, the framework-modified zeolite can have a greater number of Si—OH and/or Al—OH terminal groups than the initial zeolite. In various embodiments, the framework-modified zeolite can have at least 0.1, at least 1, at least 5, or at least 10 percent more Si—OH and/or Al—OH terminal groups than the initial zeolite. Furthermore, in one or more embodiments, the framework-modified zeolite can have a decreased aluminum content. However, in one or more embodiments, the aluminum content of the framework-modified zeolite can be maintained in an amount sufficient to preserve the unit cell size ("UCS") of the framework-modified zeolite at a minimum of at least 24.30, 24.35, or 24.40 Å.

Although any framework modification process that achieves a framework-modified zeolite having one or more of the above-described characteristics may be employed, in various embodiments the framework modification process can be selected from the group consisting of: i) contacting at least a portion of the initial zeolite with an acid; ii) calcining at least a portion of the initial zeolite; and iii) contacting at least a portion of the initial zeolite with steam. These framework modification methods, described in greater detail below, can be used individually or in any combination (including use of all three methods) to prepare the above-described framework-modified zeolite.

As just mentioned, in various embodiments, the framework modification process employed can comprise contacting at least a portion of the initial zeolite with an acid. In one or more embodiments, the initial zeolite can be modified by exposing the zeolite in a solution containing an acid for a certain amount of time and temperature. The acid chosen can be any acid sufficient to produce an acid solution having a pH of less than 6, less than 4, less than 3, in the range of from about 1 to about 6, in the range of from about 2 to about 4, or in the range of from about 4 to about 6. The acid employed during the acid framework modification can be any known or hereafter discovered mineral acid, organic acid, or mixtures of two or more thereof. Furthermore, in various embodiments, the acid employed can also be a chelating agent. Additionally, one or more complexing agents (such as fluoride) can be employed during the acid framework modification. In various embodiments, the acid selected for use herein can be a dealuminating acid. Specific examples of acids suitable for use in the various embodiments described herein include, but are not limited to, hydrochloric acid, sulfuric acid, nitric acid, acetic acid, sulfonic acid, oxalic acid, citric acid, ethylenediaminetetraacetic acid ("EDTA"), tartaric acid, malic acid, glutaric acid, succinic acid, and mixtures of two or more thereof.

In one or more embodiments, a buffer solution can be employed during the acid framework modification that uses a weak acid in combination with a weak acid salt to give a constant pH. For example, in one embodiment, citric acid can be used with ammonium citrate to produce a constant pH, while other weak acids and weak acid salts can also be used.

During the acid framework modification, the acid can be present in an amount in the range of from about 1 to about 10, or in the range of from 1.5 to 4 milliequivalents per gram of initial zeolite ("meq/g"). In further embodiments of the acid framework modification, the acid can be present in an amount of at least about 1.5, 2.0, 2.5, 3.0, 3.5, 4.0, or 4.5 meq/g. In certain embodiments, the concentration of the acid used for the acid framework modification can influence the subsequent mesopore volumes and sizes in the framework-modified zeolites. In such embodiments, the increase of acid severity used in the acid framework modification can be correlated with the increasing mesopore volumes and pore-size-distribution ("PSOD"). Furthermore, the acid framework modification can be performed at a temperature in the range of from about 20 to about 200° C., or in the range of from room temperature to about 100° C. Moreover, the acid framework modification can be performed over a time period ranging from about 1 minute to about 12 hours, in the range of from about 1 minute to about 4 hours, or in the range of from 30 minutes to 2 hours. In one or more embodiments, the initial zeolite is not steamed prior to acid framework modification.

In one or more embodiments, following the acid framework modification, the framework-modified zeolite can be vacuum filtered and washed with water. After the water wash, the framework-modified zeolite can be filtered again. Any filtering and washing techniques known or hereafter discovered in the art may be employed for these steps.

Various embodiments of the present technology can also include an additional step of controlled drying of the framework-modified zeolite prior to the below-described mesopore incorporation. Though not wishing to be bound by theory, selective drying may allow for further tuning the incorporation of controlled mesoporosity in zeolites while maintaining a desired amount of microporosity. In some embodiments, the amount of microporosity and mesoporosity in zeolites can be controlled during framework modification by using different drying conditions following acid treatment. For instance, it appears that severe drying conditions (e.g., 80° C. overnight) manage to condense some of the hydroxyl terminal groups created during the acid treatment thereby eliminating at least some of the added reactivity of the zeolite; however, other drying conditions can still be used. Increases in the severity of the drying conditions may allow for the incorporation of significant mesoporosity into the zeolite, while still maintaining a high degree of microporosity in the zeolite. By increasing the severity of drying conditions, a higher amount of crystallinity and unit cell size ("UCS") can be preserved. Drying processes can include, for example, spray drying over a short period (e.g., milliseconds) and flash drying over a very short period (e.g., hundredths of a second).

In one or more embodiments, the optional drying step can include drying at a temperature of at least 20, at least 50, or at least 80° C. Additionally, the drying step can be performed at a temperature in the range of from about 20 to about 150° C., in the range of from about 50 to about 120° C., or in the range of from 70 to 90° C. Furthermore the drying step can be performed for a time period of at least 5 minutes, at least 30 minutes, or at least 1 hour. In other embodiments, the drying step can be performed for a time period in the range of from about 5 minutes to about 24 hours, in the range of from about 15 minutes to about 12 hours, or in the range of from 30 minutes to 2 hours.

In still other embodiments, the drying step can be omitted entirely. In other words, after filtering the acid-treated framework-modified zeolite, the resulting wet cake can be directly subjected to the below-described mesopore formation process.

In addition or in the alternative to the above-described acid framework modification procedure, the initial zeolite can subjected to calcination. Thus, in various embodiments, the above-mentioned framework modification process can comprise calcining at least a portion of the initial zeolite. Any methods known or hereafter discovered for calcining a zeolite may be employed in the embodiments described herein.

In one or more embodiments, the initial zeolite can be calcined at a temperature of at least 300° C., at least 400° C., at least 500° C., at least 600° C., at least 700° C., at least 800° C., at least 900° C., or at least 1,000° C. Additionally, the initial zeolite can be calcined at a temperature in the range of from about 400 to about 1,200° C., in the range of from about 600 to about 1,200° C., in the range of from about 700 to about 1,100° C., or in the range of 800 to 1,000° C. In various embodiments, the calcination framework modification can be performed in a calcination environment comprising the initial zeolite and further comprising air and/or an inert gas. In one or more embodiments, the calcination environment can primarily comprise air in addition to the initial zeolite. In other embodiments, the calcination environment can primarily comprise nitrogen in addition to said initial zeolite.

In addition or in the alternative to the above-described acid framework modification procedure and/or calcination framework modification procedure, the initial zeolite can be subjected to steaming. Thus, in various embodiments, the above-mentioned framework modification process can comprise contacting at least a portion of the initial zeolite with steam. Any methods known or hereafter discovered for steaming a zeolite may be employed in the embodiments described herein.

In one or more embodiments, the initial zeolite can be contacted with steam having a temperature of at least 450° C., at least 550° C., at least 650° C., or at least 700° C. Additionally, the initial zeolite can be contacted with steam having a temperature in the range of from about 450 to about 1,000° C., in the range of from 500 to about 950° C., in the range of from about 650 to about 950° C., in the range of from about 700 to about 850° C., or about 788° C. Steam treatment can be performed for a time period ranging from about 1 minute to about 24 hours, from about 5 minutes to about 12 hours, or from 10 minutes to 8 hours.

As mentioned above, the framework-modified zeolite (e.g., acid-treated, calcined, and/or steam-treated zeolite) can be subjected to a mesopore formation process in order to form at least one mesopore in the framework-modified zeolite. Methods for mesopore incorporation contemplated by various embodiments of the present technology (e.g., introduction of mesoporosity in zeolites) can generally include the following steps:
1. Contacting the framework-modified zeolite with a pH controlling medium, optionally in the presence of a pore forming agent, under various time and temperature conditions.
2. Filtering, washing, and drying the zeolite.
3. Removing and/or recovering the pore forming agent (if present), for example, by calcination (removal) and/or chemical extraction (recovery).
4. The resulting material can also be chemically modified (e.g., by ion exchange with rare earths); blended with binders, matrix, and additives; and shaped (e.g., into beads, pellets, and FCC catalysts).

In one or more embodiments, the mesopore formation process can be performed employing any reagents and under any conditions described in U.S. Patent Application Publication No. 2007/0244347, the entire disclosure of which is incorporated herein by reference. For example, the temperature employed during mesopore formation can range from about room temperature to about 200° C. The time period employed can be in the range of from about 2 hours to about 2 weeks.

In one or more embodiments, the mesopore formation process at least comprises contacting the above-described framework-modified zeolite with a base. In various embodiments, the above-mentioned pH controlling medium can have a pH of at least 8, in the range of from about 8 to about 14, in the range of from about 8 to about 12, or in the range of from about 9 to about 11. Any base suitable for providing a pH in the desired range may be employed. In various embodiments, the base can be selected from the group consisting of ammonium hydroxide, tetraalkyl ammonium hydroxides, sodium hydroxide, potassium hydroxide, sodium carbonate, potassium carbonate, amines, and mixtures of two or more thereof. In certain embodiments, the base comprises a mixture of ammonium hydroxide and sodium hydroxide.

Though not wishing to be bound by theory, it is believed that contacting the above-described framework-modified zeolite with a base may cause at least partial desilication of the framework-modified zeolite. Accordingly, in various embodiments, contacting the framework-modified zeolite with a base may produce an at least partially desilicated zeolite. Additionally, though again not wishing to be bound by theory, it is believed that contacting the above-described framework-modified zeolite with a base can increase the crystalline content of the framework-modified zeolite. Accordingly, in various embodiments, the resulting mesoporous zeolite (described more fully below) can have a crystalline content that is at least 1, at least 5, at least 10, at least 15, at least 20, at least 25, at least 30, at least 35, or at least 40 percent greater than the framework-modified zeolite. Furthermore, the resulting mesoporous zeolite can have a crystalline content that is at least 60, at least 65, at least 70, at least 75, at least 80, at least 85, at least 90, at least 95, or at least 99 percent of the crystalline content of the above-described initial zeolite, as measured by XRD. In further embodiments, the mesoporous zeolite can have a crystalline content of at least 20, at least 25, at least 30, at least 35, at least 40, at least 45, at least 50, at least 55, at least 60, at least 65, at least 70, at least 75, at least 80, at least 85, at least 90, at least 95, or at least 99 weight percent, as measured by XRD.

As noted above, a pore forming agent may optionally be employed along with the pH controlling medium. In one or more embodiments, the pore forming agent can include a surfactant. When basic conditions are employed, typically a cationic surfactant can be used. In one or more embodiments, the surfactant employed can comprise one or more alkyltrimethylammonium salts and/or one or more dialkyldimethylammonium salts. In various embodiments, the surfactant can be selected from the group consisting of cetyltrimethyl ammonium bromide ("CTAB"), cetyltrimethyl ammonium chloride ("CTAC"), and mixtures thereof. Other suitable pore forming agents include, but are not limited to, non-ionic surfactants, polymers (e.g., block copolymers), and soft templates.

In alternate embodiments, the mesopore introduction process can be performed in the absence or substantial absence of a pore forming agent. Thus, in various embodiments, the mesopore introduction process can be performed in the absence or substantial absence of a surfactant. Similarly, the mesopore introduction process can be performed in the absence or substantial absence of any cationic surfactants, non-ionic surfactants, polymers (e.g., block copolymers), and soft templates.

In various embodiments, following contact with the pH controlled medium, the zeolite can be subjected to thermal treatment. In various embodiments, such thermal treatment can include contacting at least a portion of the zeolite with steam. In one or more embodiments, the zeolite can be contacted with steam having a temperature of at least 450° C., at least 550° C., at least 650° C., or at least 700° C. Additionally, following contact with the pH controlled medium, the zeolite can be contacted with steam having a temperature in the range of from about 450 to about 1,000° C., in the range of from about 500 to about 950° C., in the range of from about 650 to about 950° C., in the range of from about 700 to about 850° C., or about 788° C. Thermal treatment can be performed for a time period ranging from about 1 minute to about 24 hours, about 5 minutes to about 12 hours, or about 10 minutes to about 8 hours.

Following the pH controlled medium contacting step, the zeolite can be filtered, washed, and/or dried. In one or more embodiments, the zeolite can be filtered via vacuum filtration and washed with water. Thereafter, the recovered zeolite can optionally be filtered again and optionally dried.

Following the filter, wash, and drying steps, the zeolite can be subjected to additional heat treatment or chemical extraction in order to remove or recover at least a portion of the pore forming agent, if employed. In one or more embodiments, the zeolite can be calcined in nitrogen at a temperature in the range of from about 500 to about 600° C., and then in air for pore forming agent (e.g., surfactant) removal. The pore forming agent removal technique is selected based, for example, on the time needed to remove all of the pore forming agent from the zeolite. The total time period employed for heat treatment of the zeolite can be in the range of from about 30 minutes to about 24 hours, or in the range of from 1 to 12 hours.

In various embodiments, the resulting mesoporous zeolite can be subjected to one or more post-formation treatments. Suitable post-formation treatments are described, for example, in U.S. Patent Application Publication No. 2007/0244347, which, as noted above, is incorporated herein by reference in its entirety. In various embodiments, the mesoporous zeolite can be subjected to one or more post-formation treatments selected from the group consisting of calcination, ion exchange, steaming, incorporation into an adsorbent, incorporation into a catalyst, silicon incorporation, incorporation into a membrane, and combinations of two or more thereof. Suitable ion exchange procedures for the resulting mesoporous zeolite include, but are not limited to, ammonium ion exchange, rare earth ion exchange, lithium ion exchange, potassium ion exchange, calcium ion exchange, and combinations of two or more thereof.

The resulting mesoporous zeolite can be a one-phase hybrid single crystal having long range crystallinity. In one or more embodiments, the mesoporous zeolite can be fully crystalline, and can include mesopore surfaces defining a plurality of mesopores. A cross-sectional area of each of the plurality of mesopores can be substantially the same. Additionally, in one or more embodiments the mesoporous zeolite can be a mesostructured zeolite. In various embodiments, the mesoporous zeolite can have a total 20 to 80 Å diameter mesopore volume of at least 0.05, 0.06, 0.07, 0.08, 0.09, 0.10, 0.11, 0.12, 0.13, 0.14, 0.15, 0.20, or 0.25 cc/g. Additionally, the mesoporous zeolite can have a total 20 to 80 Å diameter mesopore volume in the range of from about 0.05 to about 0.70, in the range of from about 0.10 to about 0.60 cc/g, in the range of from about 0.15 to about 0.50 cc/g, or in the range of from 0.20 to 0.40 cc/g.

In various embodiments, the resulting mesoporous zeolite can have a total 20 to 80 Å diameter mesopore volume that is at least 5, at least 10, at least 20, at least 30, at least 40, at least 50, at least 60, at least 70, at least 80, at least 90, at least 100, at least 200, at least 300, at least 400, or at least 500 percent greater than the 20 to 80 Å diameter mesopore volume of the above-described initial zeolite. Furthermore, the mesoporous zeolite can have a total 20 to 80 Å diameter mesopore volume that is at least 0.02, at least 0.04, at least 0.05, at least 0.06, at least 0.07, at least 0.08, at least 0.09, at least 0.1, at least 0.2, at least 0.3, at least 0.4, at least 0.5, or at least 1.0 cc/g greater than the total 20 to 80 Å diameter mesopore volume of the initial zeolite.

In various embodiments, the mesoporous zeolite can have a framework Si/Al of less than 50, less than 45, less than 40, less than 35, less than 30, less than 25, less than 20, less than 15, less than 10, or less than 5. Additionally, the mesoporous zeolite can have a framework Si/Al in the range of from 1 to 30, in the range of from 2 to 25, or in the range of from 5 to 20.

As noted above, in various embodiments the severity of the framework modification process can be selected so as to eliminate essentially all (e.g., 95 volume percent) of the crystallinity from the initial zeolite. Accordingly, in various embodiments, the mesoporous zeolite can have a crystalline content of less than 10, less than 5, less than 4, less than 3, less than 2, or less than 1 weight percent as measured by XRD. Furthermore, in various embodiments, the mesoporous zeolite can be a mesoporous material having no or substantially no crystalline content as measured by XRD.

Applications

The unique structure of mesoporous zeolites will be useful to a variety of fields, and should address certain limitations associated with conventional zeolites. As catalysis is an important field of application for zeolites, special emphasis is placed on the catalytic applications of mesoporous zeolites.

The combination of a mesostructure, a high surface-area, and a controlled pore or interior thickness, as measured between adjacent mesopores, should provide access for bulky molecules and reduce the intracrystalline diffusion barriers. Thus, enhanced catalytic activity for bulky molecules should be observed using mesoporous zeolites, as compared to conventional zeolites. Catalytic cracking is selectivity and/or efficiency limited, because diffusion is limited by the small pore size of the zeolite Y. Because the conventional unconverted zeolite crystal has limited diffusion, it is difficult for an initial reaction product (e.g., 1,3-diisopropyl benzene) to exit the zeolite. As a result, over cracking occurs and light compounds are formed resulting in excess formation of undesirable products, such as light gases and coke. In contrast to catalytic cracking with the unmodified conventional zeolite Y, the fully crystalline mesoporous zeolite with the larger pore size, the controlled mesopore volume, and the controlled interior or pore wall thickness facilitates the exit of desired products (e.g., 1,3-diisopropyl benzene) from the mesostructure and minimizes the over cracking that produces light gases and coke. As a result, there is a higher conversion to the desired product, i.e., 1,3-diisopropyl benzene.

Acid catalysts with well-defined ultra-large pores are highly desirable for many applications, especially for catalytic cracking of the gas oil fraction of petroleum, whereby slight improvements in catalytic activity or selectivity would translate to significant economic benefits. More than 135 different zeolitic structures have been reported to date, but only about a dozen of them have commercial applications, mostly zeolites with 3-D (3-dimensional) pore structures. The incorporation of 3-D mesopores may be beneficial for zeolites with 1-D and 2-D pore structures as it would greatly facilitate intracrystalline diffusion. Zeolites with 1-D and 2-D pore structures are not widely used, because the pore structure is less then optimal.

Pyrolysis of plastics has gained renewed attention due to the possibility of converting these abundant waste products into valuable chemicals while also producing energy. Acidic catalysts, such as zeolites, have been shown to be able to reduce significantly the decomposition temperature of plastics and to control the range of products generated. However, the accessibility of the bulky molecules produced during plastic degradation has been severely limited by the micropores of zeolites. The use of mesoporous zeolites can allow for reduced decomposition temperatures compared to unmodified commercial zeolites.

With their improved accessibility and diffusivity compared to conventional zeolites, mesoporous zeolites may also be employed in place of unmodified conventional zeolites in other applications, such as gas and liquid-phase adsorption, separation, catalysis, catalytic cracking, catalytic hydrocracking, catalytic isomerization, catalytic hydrogenation, catalytic hydroformilation, catalytic alkylation, catalytic acylation, ion-exchange, water treatment, pollution remediation, etc. Many of these applications suffer currently from limitations associated with the small pores of zeolites, especially when bulky molecules are involved. Mesoporous zeolites present attractive benefits over zeolites in such applications.

Organic dye and pollutant removal from water is of major environmental importance, and represents the third major use of zeolites (accounting for 80 tons of zeolites per year). However, most of the organic dyes are bulky, which make their removal slow or incomplete, requiring a huge excess of zeolites in the process. Mesoporous zeolites offer significant advantage over unmodified conventional zeolites in organic dye and pollutant removal with their larger surface area and pore size.

Application in Petrochemical Processing

The mesoporous zeolites can have one or more of controlled pore volume, controlled pore size (e.g., cross sectional area and/or diameter), and controlled pore shape. Hydrocarbon reactions, including petrochemical processing, are mass-transfer limited. Accordingly, a fully crystalline mesoporous catalyst with controlled pore volume, pore size, and/or pore shape can facilitate transport of the reactants to and within active catalyst sites within the fully crystalline mesoporous catalyst and transport the products of the reaction out of the catalyst. Fully crystalline mesoporous zeolites enable processing of very large or bulky molecules, with dimensions of, for example, from about 2 to about 60 nm, from about 5 to about 50 nm, and from about 30 to about 60 nm.

Hydrocarbon and/or petrochemical feed materials that can be processed with the mesoporous zeolites include, for example, a gas oil (e.g., light, medium, or heavy gas oil) with or without the addition of resids. The feed material can include thermal oils, residual oils, (e.g., atmospheric tower bottoms ("ATB"), heavy gas oil ("HGO"), vacuum gas oil ("VGO"), and vacuum tower bottoms ("VTB"), cycle stocks, whole top crudes, tar sand oils, shale oils, synthetic fuels (e.g., products of Fischer-Tropsch synthesis), heavy hydrocarbon fractions derived from the destructive hydrogenation of coal, tar, pitches, asphalts, heavy and/or sour and/or metal-laden crude oils, and waxy materials, including, but not limited to, waxes produced by Fischer-Tropsch synthesis of hydrocarbons from synthesis gas. Hydrotreated feedstocks derived from any of the above described feed materials may also be processed by using the fully crystalline mesoporous zeolitic materials.

Heavy hydrocarbon fractions from crude oil contain most of the sulfur in crude oils, mainly in the form of mercaptans, sulfides, disulfides, thiophenes, benzothiophenes, dibenzothiophenes, and benzonaphthothiophenes, many of which are large, bulky molecules. Similarly, heavy hydrocarbon fractions contain most of the nitrogen in crude oils, principally in the form of neutral N-compounds (e.g., indole and carbazole), basic N-compounds (e.g., pyridine, quinoline, acridine, and phenenthridine), weakly basic N-compounds (e.g., hydroxipyridine and hydroxiquinoline), and their substituted H-, alkyl-, phenyl- and naphthyl-substituted derivatives, many of which are large, bulky materials. Sulfur and nitrogen species are removed for production of clean fuels. Resids or deeper cut gas oils with high metals content can also be processed using the mesoporous zeolites described herein.

In various embodiments, the mesoporous zeolites can be employed in chemical processing operations including, for example, catalytic cracking, fluidized catalytic cracking, hydrogenation, hydrosulfurization, hydrocracking, hydroisomerization, oligomerization, alkylation, or any of these in combination. Any of these chemical processing operations may be employed to produce, for example, a petrochemical product by reacting a petrochemical feed material with the mesoporous zeolites described herein.

In various embodiments, the mesoporous zeolite can be used as an additive to other catalysts and/or other separation materials including, for example, a membrane, an adsorbent, a filter, an ion exchange column, an ion exchange membrane, or an ion exchange filter.

In various embodiments, the mesoporous zeolite can be used alone or in combination as an additive to a catalyst. The mesoporous zeolite can be added at from about 0.05 to about 100 weight percent to the catalyst. The additive may be employed in chemical processing operations including, for example, catalytic cracking, fluidized catalytic cracking, hydrogenation, hydrosulfurization, hydrocracking, hydroisomerization, oligomerization, alkylation, or any of these in combination. For example, the addition of small amounts of fully crystalline mesoporous zeolites and/or crystalline nanostructured zeolites to conventional commercially available FCC catalysts allows for improvement in the catalytic performance.

Generally, FCC uses an FCC catalyst, which is typically a fine powder with a particle size of about 10 to 200 microns. The FCC catalyst can be suspended in the feed and propelled upward into a reaction zone. A relatively heavy hydrocarbon or petrochemical feedstock (e.g., a gas oil) can be mixed with the FCC catalyst to provide a fluidized suspension. The feedstock can be cracked in an elongated reactor, or riser, at elevated temperatures to provide a mixture of petrochemical products that are lighter hydrocarbon products than were provided in the feedstock. Gaseous reaction products and spent catalyst are discharged from the riser into a separator where they can be regenerated. Typical FCC conversion conditions employing FCC catalysts include a riser top temperature of about 500 to about 595° C., a catalyst/oil weight ratio of about 3 to about 12, and a catalyst residence time of about 0.5 to about 15 seconds. The higher activity of the mesoporous zeolites can enable less severe processing conditions, such as, for example, lower temperature, lower catalyst to oil ratios, and/or lower contact time.

In various embodiments, a small amount of mesoporous zeolite blended with conventional FCC catalysts can enable pre-cracking of the bulkier molecules by the mesoporous zeolite contained in the blend. Conventional FCC catalysts have pore sizes too small to accommodate bulkier molecules. After the bulkier molecules have been pre-cracked, they are processed in the small pores of the conventional FCC catalyst.

In various embodiments, mesoporous zeolites can be blended with conventional catalysts. The additive mesoporous zeolites can be incorporated into the conventional catalyst pellet. Shaped (e.g., pelletized) mesoporous materials can be mixed with the catalyst pellet. Alternatively, a conventional catalyst and the mesoporous zeolites can be layered together. Any such mixture can be used in a refining application, for example, in fluidized catalytic cracking directly as is done with other additives. The amount of mesoporous zeolite added and the manner by which it is blended can be used to tune the yield and/or the structure of the products.

In one or more embodiments, the addition of or incorporation of mesoporous zeolites to conventional commercially available Thermofor Catalytic Cracking ("TCC") catalysts can provide an improvement in the catalytic performance. The TCC process is a moving bed process that uses pellet or bead shaped conventional catalysts having an average particle size of about one-sixty-fourth to one-fourth inch. Hot catalyst beads progress with a hydrocarbon or petrochemical feed stock downwardly through a cracking reaction zone. The hydrocarbon products are separated from the spent catalyst and recovered. The catalyst is recovered at the lower end of the zone and recycled (e.g., regenerated). Typically, TCC conversion conditions include an average reactor temperature from about 450 to about 510° C., a catalyst/oil volume ratio of from about 2 to about 7, and a reactor space velocity of from about 1 to about 2.5 vol/hr/vol. Mesoporous zeolites can be substituted for TCC catalysts to improve the catalytic cracking of petrochemical or hydrocarbon feedstocks to petroleum product. Alternatively, the mesoporous zeolites can be blended with the TCC catalyst.

In various embodiments, mesoporous zeolites can be used as catalyst additives in any other catalytic application. For example, they may be used as additives in processes where bulky molecules must be processed.

In other various embodiments, mesoporous zeolites can be used in hydrogenation. Conventional zeolites are good hydrogenation supports because they possess a level of acidity needed both for the hydrogenation of the aromatic compounds and for tolerance to poisons such as, for example, sulfur. However, the small pore size of conventional zeolites limit the size of the molecules that can be hydrogenated. Various metals, such as Pt, Pd, Ni, Co, Mo, or mixtures of such metals, can be supported on mesoporous zeolites using surface modification methods described herein such as, for example, ion exchange. The hydrogenation catalytic activity of mesoporous zeolites modified to support various metals (e.g., doped with metals) show a higher hydrogenation activity for bulky aromatic compounds as compared to other conventional materials, for example, metal supported on alumina, silica, metal oxides, MCM-41, and conventional zeolites. The mesoporous zeolites modified to support various metals also show, compared to conventional materials, a higher tolerance to sulfur such as, for example, thiophene and dibenzothiophene, which are common bulky components of crude oil that often end up in gas oil fractions.

In other various embodiments, mesoporous zeolites can be used in hydrodesulfurization ("HDS"), including, for example, deep HDS and hydrodesulfurization of 4,6-dialkyldibenzothiophenes. Deep removal of sulfur species from gas oil has two main limitations: i) the very low reactivity of some sulfur species, for example, dimethyldibenzothiophenes and ii) the presence of inhibitors in the feedstocks such as, for example, $H_2S$. Deep HDS is currently done with active metal sulfides on alumina, silica/alumina, and alumina/zeolite.

Generally, during HDS the feedstock is reacted with hydrogen in the presence of an HDS catalyst. Oxygen and any sulfur and nitrogen present in the feed is reduced to low levels. Aromatics and olefins are also reduced. The HDS reaction conditions are selected to minimize cracking reactions, which reduce the yield of the most desulfided fuel product. Hydrotreating conditions typically include a reaction temperature from about 400 to about 900° F., a pressure between 500 to 5,000 psig, a feed rate (LHSV) of 0.5 $hr^{-1}$ to 20 $hr^{-1}$ (v/v), and overall hydrogen consumption of 300 to 2,000 scf per barrel of liquid hydrocarbon feed (53.4-356 m3 $H_2/m^3$ feed).

Suitable active metal sulfides include, for example, Ni and Co/Mo sulfides. Zeolites provide strong acidity, which improves HDS of refractory sulfur species through methyl group migration. Zeolites also enhance the hydrogenation of neighboring aromatic rings. Zeolite acidity enhances the liberation of $H_{2S}$ from the metal sulfide thereby increasing the tolerance of the catalyst to inhibitors. However, bulky methylated polyaromatic sulfur species are not able to access the acidic sites of conventional zeolites. In contrast, the controlled mesoporosity and strong acidity of fully crystalline mesoporous zeolites provide accessibility to the acidic sites and acidity that allows for the deeper HDS required for meeting future environmental restrictions.

In other various embodiments, mesoporous zeolites can be used in hydrocracking. Metals, including transition metals such as, for example, Ni, Co, W, and Mo, and metal compounds are commercially used in hydrocracking reactions. These metals can be supported on mesoporous zeolites by previously described methods. The mesoporous zeolites including metals can be employed for hydrocracking of various feedstocks such as, for example, petrochemical and hydrocarbon feed materials.

Typically, hydrocracking involves passing the feedstock, such as a heavy fraction, through one or more hydrocracking catalyst beds under conditions of elevated temperature and/or pressure. The plurality of catalyst beds may function to remove impurities such as any metals and other solids. The catalyst beads also crack or convert the longer chain molecules in the feedstock into smaller ones. Hydrocracking can be effected by contacting the particular fraction or combination of fractions with hydrogen in the presence of a suitable catalyst at conditions, including temperatures in the range of from about 600 to about 900° F. and at pressures from about 200 to about 4,000 psia, using space velocities based on the hydrocarbon feedstock of about 0.1 to 10 hr$^{-1}$.

As compared to conventional unmodified catalyst supports such as, for example, alumina, silica, and zeolites, the mesoporous zeolites including metals allow for the hydrocracking of higher boiling point feed materials. The mesoporous zeolites including metals produce a low concentration of heteroatoms and a low concentration of aromatic compounds. The mesoporous zeolites including metals exhibit bifunctional activity. The metal, for example a noble metal, catalyzes the dissociative adsorption of hydrogen and the mesoporous zeolite provides the acidity.

The controlled pore size and controlled mesopore surface in the mesoporous zeolites including metals can make the bifunctional activity more efficiently present in the mesoporous catalysts as compared to a bifunctional conventional catalyst. In addition to the zeolitic acidity present in the fully crystalline mesoporous zeolites, the controlled pore size enables larger pores that allow for a higher dispersion of the metal phase and the processing of larger hydrocarbons.

In other embodiments, mesoporous zeolites can be used in hydroisomerization. Various metals and mixtures of metals, including, for example, noble metals such as nickel, molybdenum, and combinations thereof in, for example, their acidic form, can be supported on mesoporous zeolites.

Typically, hydroisomerization is used to convert linear paraffins to branched paraffins in the presence of a catalyst and in a hydrogen-rich atmosphere. Hydroisomerization catalysts useful for isomerization processes are generally bifunctional catalysts that include a dehydrogenation/hydrogenation component and an acidic component. Paraffins are exposed to fully crystalline mesoporous zeolites including metals and are isomerized in a hydrogen flow at a temperature ranging from about 150 to about 350° C. thereby producing branched hydrocarbons and high octane products. The fully crystalline mesoporous zeolites including metals permit hydroisomerization of bulkier molecules than is possible with commercial conventional catalysts due, at least in part, to their controlled pore size and pore volume.

In other embodiments, mesoporous zeolites can be used in the oligomerization of olefins. The controlled pore shape, pore size, and pore volume improve the selectivity properties of the mesoporous zeolites. The selectivity properties, the increased surface area present in the mesospore surfaces, and the more open structure of the mesoporous zeolites can be used to control the contact time of the reactants, reactions, and products inside the mesoporous zeolites. The olefin can contact the mesoporous zeolites at relatively low temperatures to produce mainly middle-distillate products via olefin-oligomerization reactions. By increasing the reaction temperature, gasoline can be produced as the primary fraction.

Where the mesoporous zeolites are used in FCC processes, the yield of olefins production can be increased relative to FCC with conventional zeolites. The increased yield of olefins can be reacted by oligomerization in an olefin-to-gasoline-and/or-diesel process, such as, for example, MOGD (Mobile Olefins to Gas and Diesel, a process to convert olefins to gas and diesel). In addition, olefins of more complex structure can be oligomerized using the mesoporous zeolites described herein.

The LPG fraction produced using mesoporous zeolites has a higher concentration of olefins compared to other catalysts, including, for example, various conventional FCC catalysts, zeolites, metals oxides, and clays under catalytic cracking conditions both in fixed bed and fluidized bed reactor conditions. The mesopore size of the mesoporous zeolites readily allows the cracked products to exit the mesoporous zeolites. Accordingly, hydrogen transfer reactions are reduced and the undesired transformation of olefins to paraffins in the LPG fraction is reduced. In addition, over-cracking and coke formation are limited, which increases the average life time of the catalyst.

The controlled pore size, pore volume, and mesopore surfaces provide an open structure in the mesotructured zeolites. This open structure reduces the hydrogen transfer reactions in the gasoline fraction and limits the undesired transformation of olefins and naphthenes into paraffins and aromatics. As a result, the octane number (both RON and MON) of the gasoline produced using the mesoporous zeolites is increased.

The acidity and the controlled mesoporosity present in the mesoporous zeolites can enable their use in alkylation reactions. Specifically, olefins and paraffins react in the presence of the mesoporous zeolites to produce highly branched octanes. The highly branched octane products readily exit the open structure of the fully crystalline mesoporous zeolites, thereby minimizing unwanted olefin oligomerization.

In other embodiments, the mesoporous zeolites can be used to process a petrochemical feed material to petrochemical product by employing any of a number of shape selective petrochemical and/or hydrocarbon conversion processes. In one embodiment, a petrochemical feed can be contacted with the mesoporous zeolite under reaction conditions suitable for dehydrogenating hydrocarbon compounds. Generally, such reaction conditions include, for example, a temperature of from about 300 to about 700° C., a pressure from about 0.1 to about 10 atm, and a WHSV from about 0.1 to about 20 hr$^{-1}$.

In other embodiments, a petrochemical feed can be contacted with the mesoporous zeolites under reaction conditions suitable for converting paraffins to aromatics. Generally, such reaction conditions include, for example, a temperature of from about 300 to about 700° C., a pressure from about 0.1 to about 60 atm, a WHSV of from about 0.5 to about 400 hr$^{-1}$, and an $H_2$/HC mole ratio of from about 0 to about 20.

In other embodiments, a petrochemical feed can be contacted with the mesoporous zeolites under reaction conditions suitable for converting olefins to aromatics. Generally, such reaction conditions include, for example, a temperature of from about 100 to about 700° C., a pressure from about 0.1 to about 60 atm, a WHSV of from about 0.5 to about 400 hr-1, and an $H_2$/HC mole ratio from about 0 to about 20.

In other embodiments, a petrochemical feed can be contacted with the mesoporous zeolites under reaction conditions suitable for isomerizing alkyl aromatic feedstock components. Generally, such reaction conditions include, for example, a temperature of from about 230 to about 510° C., a pressure from about 3 to about 35 atm, a WHSV of from about 0.1 to about 200 hr$^{-1}$, and an $H_2$/HC mole ratio of from about 0 to about 100.

In other embodiments, a petrochemical feed can be contacted with the mesoporous zeolites under reactions conditions suitable for disproportionating alkyl aromatic components. Generally, such reaction conditions include, for example, a temperature ranging from about 200 to about 760° C., a pressure ranging from about 1 to about 60 atm, and a WHSV of from about 0.08 to about 20 hr$^{-1}$.

In other embodiments, a petrochemical feed can be contacted with the mesoporous zeolites under reaction conditions suitable for alkylating aromatic hydrocarbons (e.g., benzene and alkylbenzenes) in the presence of an alkylating agent (e.g., olefins, formaldehyde, alkyl halides and alcohols). Generally, such reaction conditions include a temperature of from about 250 to about 500° C., a pressure from about 1 to about 200 atm, a WHSV of from about 2 to about 2,000 hr$^{-1}$, and an aromatic hydrocarbon/alkylating agent mole ratio of from about 1/1 to about 20/1.

In other embodiments, a petrochemical feed can be contacted with the mesoporous zeolites under reaction conditions suitable for transalkylating aromatic hydrocarbons in the presence of polyalkylaromatic hydrocarbons. Generally, such reaction conditions include, for example, a temperature of from about 340 to about 500° C., a pressure from about 1 to about 200 atm, a WHSV of from about 10 to about 1,000 hr$^{-1}$, and an aromatic hydrocarbon/polyalkylaromatic hydrocarbon mole ratio of from about 1/1 to about 16/1.

Generally, suitable conditions for a petrochemical or hydrocarbon feed to contact the mesoporous zeolites include temperatures ranging from about 100 to about 760° C., pressures ranging from above 0 to about 3,000 psig, a WHSV of from about 0.08 to about 2,000 hr$^{-1}$, and a hydrocarbon compound mole ratio of from 0 to about 100.

Application in Compound Removal

The microporosity, mesoporosity, and ion exchange properties present in the mesoporous zeolites can enable removal of inorganic and organic compounds from solutions. Suitable solutions can be aqueous or organic solutions. Accordingly, the mesoporous zeolites can be employed in water treatment, water purification, pollutant removal, and/or solvent drying. Other configurations such as fixed bed, filters, and membranes can be also used in addition to the mesoporous zeolites. Optionally, mesoporous zeolites can be employed as additives with conventional separation means, for example, fixed bed, filters, and membranes. The mesoporous zeolites can be substituted for other separation means in, for example, fixed bed, filters, and membranes. The mesoporous zeolites can be recycled by ion exchange, drying, calcinations or other conventional techniques and reused.

Application in Adsorption

The mesoporous zeolites can be used to adsorb gaseous compounds including, for example, volatile organic compounds ("VOCs"), which are too bulky to be adsorbed by conventional unmodified zeolites. Accordingly, pollutants that are too bulky to be removed by conventional unmodified zeolites can be removed from a gaseous phase by direct adsorption. Mesoporous zeolites can be employed for adsorption in various adsorption configurations such as, for example, membranes, filters and fixed beds. Adsorbed organic compounds can be desorbed from the mesoporous zeolites by heat treatment. Thus, the mesoporous zeolites can be recycled and then reused.

Application in Gas Separation

Mesoporous zeolites can be grown on various supports by employed techniques such as, for example, seeding, hydrothermal treatment, dip coating, and/or use of organic compounds. They can be physically mixed with conventional zeolites or metal oxides. Continuous layers of mesoporous zeolites can be used as membranes and/or catalytic membranes on, for example, porous supports. Mesoporous zeolites are unique molecular sieves containing both microporosity and mesoporosity. They may be employed in various configurations including, for example, membranes for separation of gases based on physicochemical properties such as, for example, size, shape, chemical affinity, and physical properties.

Application in Fine Chemicals and Pharmaceuticals

A fully crystalline mesoporous zeolite has increased active site accessibility as compared to the same zeolite in conventional form. Accordingly, the activity of some important chemical reactions used in fine chemical and pharmaceutical production can be improved by substituting a conventional zeolite used in the process for a fully crystalline mesoporous zeolite. In addition, a fully crystalline mesoporous zeolite may be employed as an additive to a catalyst typically employed in such fine chemical and pharmaceutical production reactions. Suitable processes that can be improved by using a fully crystalline mesoporous zeolite include, for example, isomerization of olefins, isomerization of functionalized saturated systems, ring enlargement reactions, Beckman rearrangements, isomerization of arenes, alkylation of aromatic compounds, acylation of arenes, ethers, and aromatics, nitration and halogenation of aromatics, hydroxyalylation of arenes, carbocyclic ring formation (including Diels-Alder cycloadditions), ring closure towards heterocyclic compounds, amination reactions (including amination of alcohols and olefins), nucleophilic addition to epoxides, addition to oxygen-compounds to olefins, esterification, acetalization, addition of heteroatom compounds to olefins, oxidation/reduction reactions such as, but not limited to, Meerwein-Ponndorf-Verley reduction and Oppenauer oxidation, dehydration reactions, condensation reactions, C—C formation reactions, hydroformylation, acetilization, and amidation.

Application in Slow Release Systems

Chemicals and/or materials having useful properties such as, for example, drugs, pharmaceuticals, fine chemicals, optic, conducting, semiconducting magnetic materials, nanoparticles, or combinations thereof, can be introduced to mesoporous zeolites using one or more modifying methods. For example, chemicals and/or materials may be incorporated into the mesoporous zeolites by, for example, adsorption or ion exchange. In addition, such useful chemicals can be combined with the mesoporous zeolites by creating a physical mixture, a chemical reaction, heat treatment, irradiation, ultrasonication, or any combination thereof.

The release of the chemicals and/or materials having useful properties can be controlled. Controlled release may take place in various systems such as, for example, chemical reactions, living organisms, blood, soil, water, and air. The controlled release can be accomplished by physical reactions or by chemical reactions. For example, controlled release can be accomplished by chemical reactions, pH variation, concentration gradients, osmosis, heat treatment, irradiation, and/or magnetic fields.

Kits

One or more embodiments also provide kits for conveniently and effectively implementing the various methods described herein. Such kits can comprise any of the mesoporous zeolites described herein, and a means for facilitating their use consistent with various methods. Such kits may provide a convenient and effective means for assuring that the methods are practiced in an effective manner. The compliance means of such kits may include any means that facilitate practicing one or more of the methods associated with the zeolites described herein. Such compliance means may include instructions, packaging, dispensing means, or combinations thereof. Kit components may be packaged for either manual or partially or wholly automated practice of the foregoing methods. In other embodiments involving kits, a kit is contemplated that includes block copolymers, and optionally instructions for their use.

EXAMPLES

The following examples are intended to be illustrative of the present invention in order to teach one of ordinary skill in the art to make and use the invention and are not intended to limit the scope of the invention in any way.

Example 1

In this example, 150 g of Zeolyst CBV 100 zeolite (sodium form of zeolite Y: $NaAlSi_{2.55}O_{7.1} \cdot xH_2O$, loss on ignition, LOI, at 850° C. of 22%-22.5%) were combined with 600 g of deionized water at room temperature with continued agitation to form a zeolite slurry. The initial pH of the slurry was 9.5 and was adjusted by drops of 10% nitric acid to a pH of 5.9. Meanwhile, 33.6 g of citric acid (Fisher Scientific), corresponding to 3.5 meq of citric acid per g of CBV 100 (on an as-received basis) were dissolved in 302.4 g of deionized water to form a 10% solution. This solution was slowly pumped into the agitating zeolite slurry. The velocity of pumping was adjusted to complete the admixing of the whole volume of acid solution in 90 minutes. The final pH of the subsequent mixture was 3.5. This stage was identical in Examples 1-4.

The resultant acid-treated, framework-modified zeolite was separated from the acid solution in a Buchner funnel and washed three times with 500 ml of room-temperature deionized water to produce an acid-treated, framework-modified zeolite filter cake. About 10% by weight of the still-wet, acid-treated, framework-modified zeolite filter cake was separated for characterization and was marked as sample 1-A, while the remaining acid-treated zeolite was placed into a stainless steel beaker. Subsequently, 1000 ml of alkaline 0.1 M KOH solution were poured into the beaker and the resultant mixture was stirred until it was homogeneous. After the solid was suspended in the alkaline solution, the mixture was heated and maintained at 80° C. with continued agitation for two hours. The resultant alkali hydroxide treated mesoporous zeolite was then separated from the alkaline solution by filtration and washed three separate times with 500 ml of hot deionized water to produce an alkali hydroxide treated mesoporous zeolite filter cake.

About 10% by weight of the still-wet, alkali hydroxide treated, mesoporous zeolite filter cake was separated for characterization as sample 1-H. The remaining alkali hydroxide treated zeolite filter cake was subjected to ammonium ion exchange with $NH_4NO_3$. During the ammonium ion exchange, an amount of solid $NH_4NO_3$ equal to the weight of the remaining alkali hydroxide treated zeolite filter cake was dissolved in sufficient deionized water to produce a 10% solution of ammonium nitrate in water. To that was added, with stirring, the remaining alkali hydroxide treated zeolite filter cake. The resultant slurry was heated, with stirring, to 80° C. for half an hour. It was then filtered, washed three times with room temperature deionized water, and dried at 80° C. A small portion of the resultant ammonium ion exchanged zeolite was labeled as sample 1-2E and removed for further analysis.

After drying, the ammonium ion exchanged zeolite (1-2E) was stabilized by heat treating in 100% steam at 560° C. for two hours, followed by one hour under $N_2$ flow at 560° C. and one hour at 560° C. under air flow. After cooling, the ammonium ion exchanged zeolite was again subjected to ammonium ion exchange under conditions similar to the exchange prior to stabilization. A small portion of the resulting ammonium ion exchanged, stabilized zeolite was labeled as 1-3E and removed for further analysis. Finally, the ammonium ion exchanged, stabilized zeolite was steam deactivated by heat treatment at a temperature of 788° C. in an atmosphere of 100% steam for 8 hours. The resultant deactivated zeolite was labeled as 1-S and a small portion was removed therefrom for further analysis.

The samples taken above were analyzed by several techniques. For instance, argon adsorption isotherms were measured using a Quadrasorb SI poresimeter (Quantochrome) at a temperature of 80K and data was recalculated by the DFT method to characterize pore volumes ("PV") and pore-size-distribution ("PSOD").

XRD patterns were recorded and unit cell size ("UCS") and percent crystallinity were calculated using a CubiXPRO X-ray diffractometer (Pananalytical). Filtered Cu X-ray radiation at 45 KV was used. Bulk molar silica-alumina ratio ("SAR") was calculated from XRF analyses made with Axios (Pananalytical) X-ray fluorescence analyzer. The results of the analyses of the samples from Example 1 at various stages of preparation are given in TABLE 1 below and in FIGS. 1-3.

Figure 1:
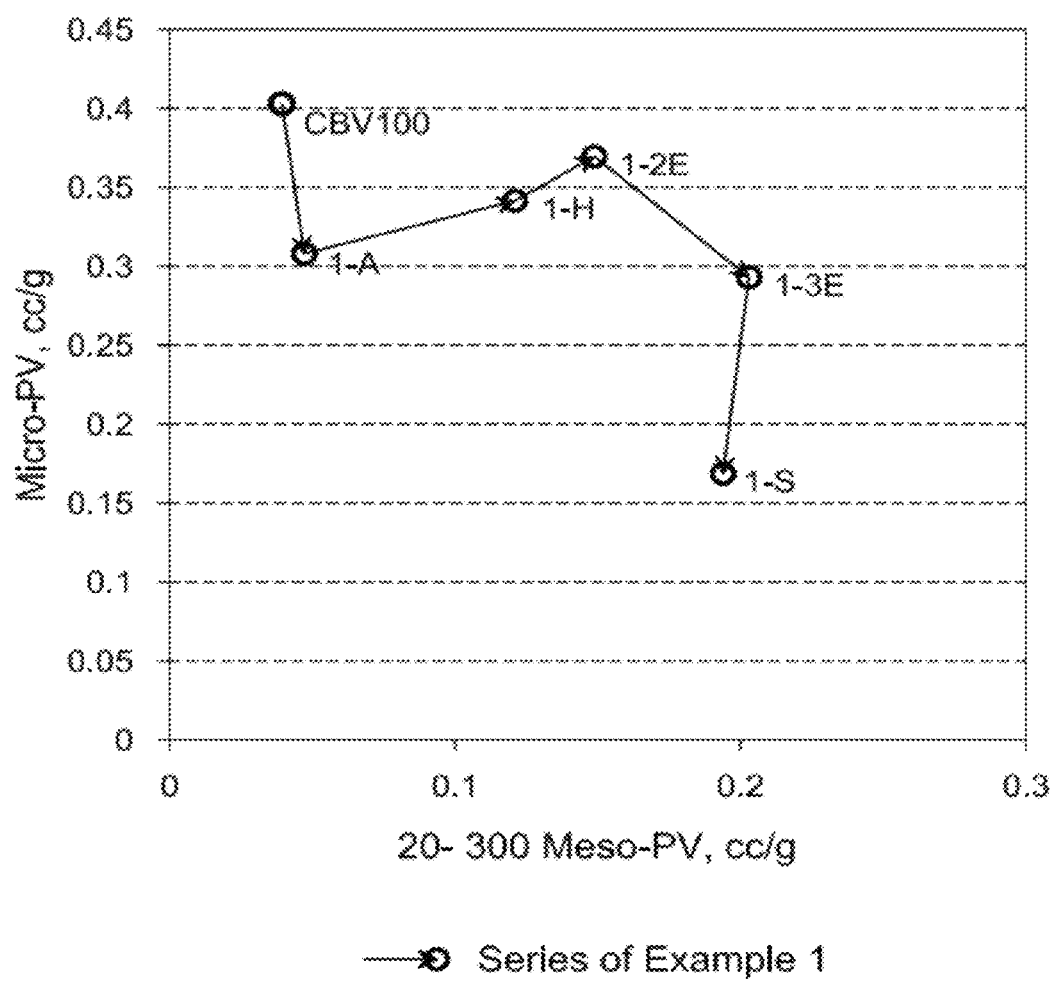

In the plot of FIG. 1, the variation of micropore and mesopore volumes within the zeolite caused by the progression of treatment in Example 1 is shown. FIG. 1 shows that samples rived without a surfactant, including those not subjected to steaming (1-3E) and those that are steamed (1-S), demonstrate promising ratios of micro- to meso-PV: ~0.3/0.2 and ~0.17/0.2, respectively.

Figure 2:
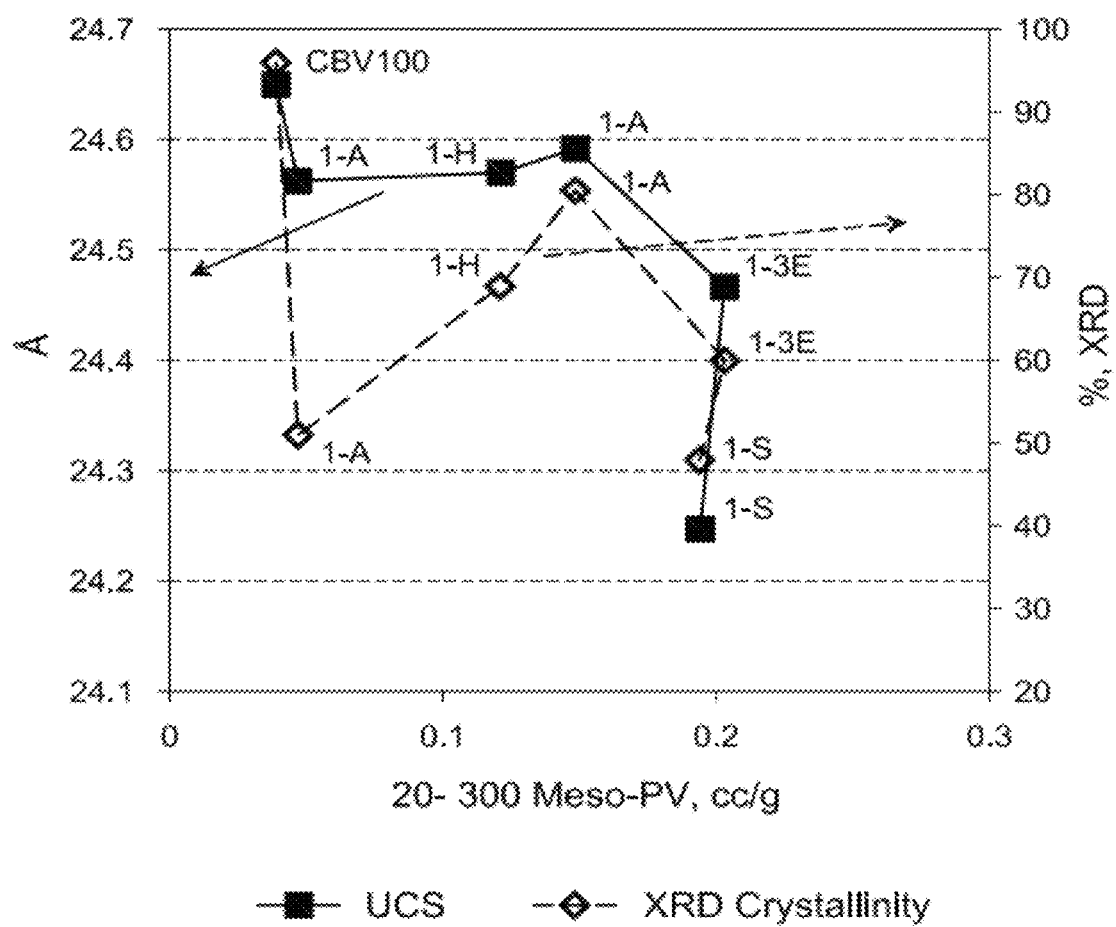

In FIG. 2, the UCS and the XRD crystallinity of the samples were plotted and analyzed. From FIG. 2 and TABLE1, one can see that the UCS, which is a measure of the framework Si/Al ratio, is relatively unchanged by the alkali hydroxide treatment, while there is a significant increase in the crystallinity (as measured by XRD).

Figure 3:
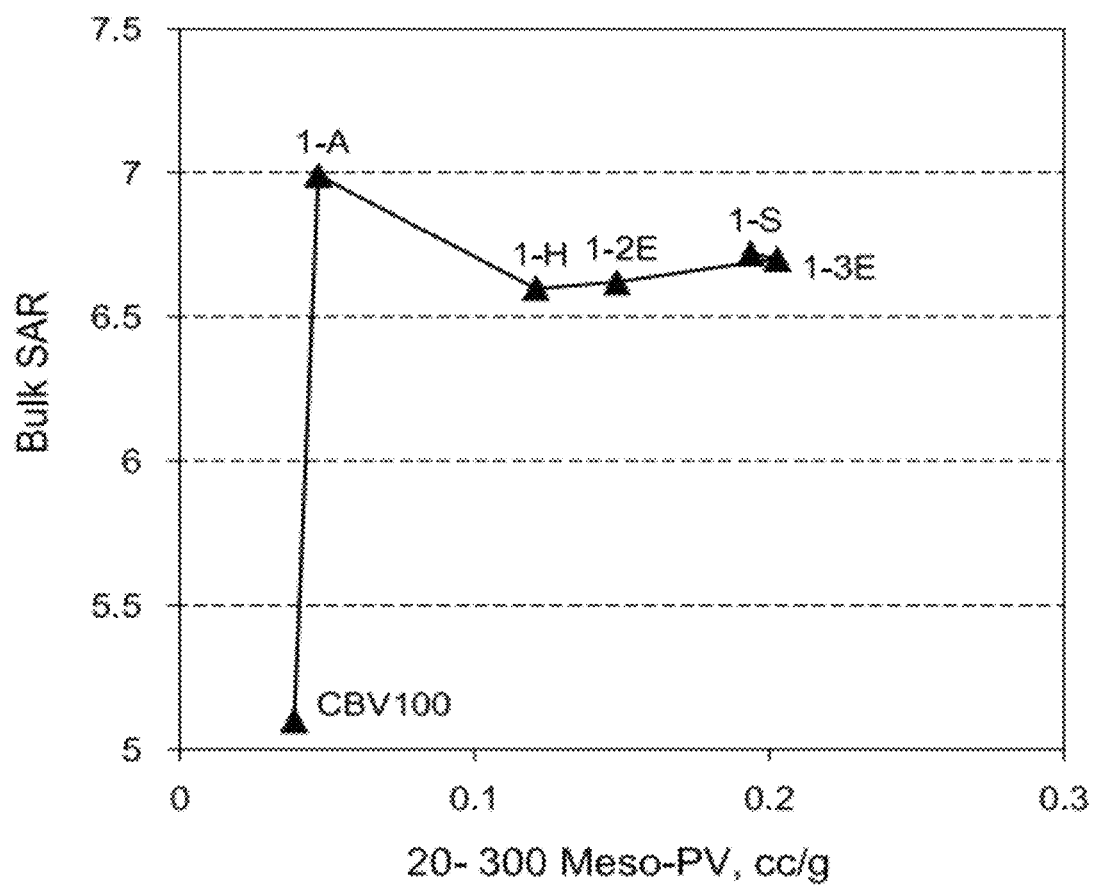
FIG. 3 is a graph of bulk silica-to-alumina ratio versus mesopore volume for the samples prepared in Example 1.

In FIG. 3, the Bulk SAR of the samples were plotted and analyzed. FIG. 3 shows that the Bulk SAR for the samples goes down after the alkali hydroxide treatment. This is evidence that the loss of silica during the alkali hydroxide treatment step primarily results from the extraction of silica from the defective parts of the crystal grains and not via desilication of the zeolite framework. In the latter case, the UCS would be affected. Consequently, the increase of crystallinity, as depicted in FIG. 2, becomes explainable as the result of removing the damaged X-ray amorphous material.

Example 2

In this example, CBV 100 zeolite was treated with citric acid in the same manner as in Example 1 to produce an acid-treated, framework-modified zeolite. Subsequently, 1000 ml of 0.1 M solution of KOH were poured on top of the acid-treated filter cake and the solids were suspended in the alkaline solution. An alkali hydroxide treated mesoporous zeolite was produced by agitating the solution without heating at room temperature for two hours. After alkali hydroxide treatment, the material was separated by filtration and washed to produce an alkali hydroxide treated mesoporous zeolite filter cake. A small portion of this cake was removed, marked as sample 2-H, and subjected to further analysis. The remaining zeolite material was subjected to ammonium ion exchange for 30 minutes at 80° C. with a 10% $NH_4NO_3$ solution containing an amount of $NH_4NO_3$ equal to the weight of alkali hydroxide treated zeolite filter cake. The resultant ammonium ion exchanged zeolite was labeled as 2-2E and a small portion was removed therefrom for further analysis.

The ammonium ion exchanged zeolite (2-2E) was stabilized by heat treating in an environment of 100% steam at 560° C. for two hours, followed by one hour under $N_2$ flow at 560° C. and one hour at 560° C. under air flow. When cooled, the ammonium ion exchanged zeolite was again subjected to ammonium ion exchange under conditions similar to the exchange prior to the stabilization step. This resultant ammonium ion exchanged, calcined zeolite was labeled as 2-3E and a small portion was removed therefrom for further analysis. Finally, the remaining material was steam deactivated at a temperature of 788° C. in an atmosphere of 100% steam for eight hours. The resultant steam-deactivated material was designated 2-S and a small portion was removed therefrom for further analysis.

The results of the analyses of the samples in Example 2 are given in TABLE 1 below.

Example 3

Treatment of the sample in Example 3 was identical to the treatment in Example 1 with the exception of using 0.1 M NaOH in place of the 0.1 M of KOH, and this treatment was applied at 80° C. for two hours. As in Examples 1 and 2, samples of the zeolite were taken during the process and analyzed. These samples were labeled 3-H, 3-2E, 3-3E, and 3-S. The results of these analyses are given in TABLE 1.

Example 4

Treatment of the sample in Example 4 was identical to the treatment in Example 2 with the exception of using 0.1 M NaOH solution in place of the 0.1 M KOH solution, and this treatment was applied for three hours at room temperature. As in Examples 1-3, samples of the zeolite were taken during the process and analyzed. These samples were labeled 4-H, 4-2E, 4-2E, and 4-S. The results of these analyses are given in TABLE 1.

Comparative Example 5

CBV 500 ultra-stable zeolite Y (Zeolyst) was subjected to steam deactivation under conditions used for Examples 1-4. The zeolite was steamed at 788° C. in an atmosphere of 100% steam for eight hours. The characteristics of the CBV 500 before and after steam deactivation are given in TABLE 1.

Comparative Example 6

In Example 6, the framework-modified ammonium form of Y zeolite ("$NH_4Y$") was treated with a surfactant to generate mesopores in the zeolite crystals.

In this example, 150 g of $NH_4Y$ was suspended in 600 g of deionized water. The pH of the slurry was 8.6 and was adjusted to 5.9 by dropwise addition of 10% nitric acid. Citric acid in 10% water solution, in an amount corresponding to 2.25 meq per g of zeolite (as-received basis), was pumped into the suspension of $NH_4Y$ in water over one hour's time to produce an acid-treated, framework-modified zeolite. The final pH of the slurry was 3.5.

After separation by filtration and washing, the acid-treated, framework-modified zeolite filter cake was suspended at 80° C. in a 15% solution of cetyltriemethylammonium chloride ("CTAC") surfactant. The amount of surfactant corresponded to 0.4 g per g of initial zeolite. After 30 minutes of agitation at 80° C., 150 ml of concentrated (30% by weight) ammonium hydroxide solution was admixed with the suspension of zeolite in CTAC solution. Agitation continued for another 30 minutes and then the mixture was placed in a capped bottle into an oven at 80° C. for overnight to produce a surfactant-treated mesoporous zeolite.

The resultant surfactant-treated mesoporous zeolite was filtered, washed with deionized water, and dried in an oven at 80° C. The dried, surfactant-treated mesoporous zeolite was stabilized by heat treating in an atmosphere of 10% $NH_3$+90% steam for two hours at 560° C., followed by one hour at 560° C. under $N_2$, and one hour at 560° C. in air to produce a stabilized mesoporous zeolite.

After cooling, the product was subjected to ammonium ion exchange to reach a residual sodium oxide ($Na_2O$) concentration of 0.1-0.2% on an anhydrous basis. This stabilized mesoporous zeolite is designated in TABLE 1 as FRESH and was analyzed.

The stabilized mesoporous zeolite was steam deactivated by heat treating at 788° C. in an atmosphere of 100% steam for 8 hours. This steam deactivated mesoporous zeolite designated in TABLE 1 as STEAMED. The characteristics of the UNSTEAMED and STEAMED zeolites are given in TABLE 1.

Comparative Examples 7, 8, and 9

Examples 7, 8 and 9 were done similarly to Example 6, except that different amounts of citric acid were used in the acidic framework modification step. The amounts of citric acid in Examples 7, 8, and 9, respectively, were 2.5, 2.75, and 3 meq of citric per g of $NH_4Y$.

Characterization data for the FRESH and STEAMED samples of Examples 7, 8, and 9 are given in TABLE 1 below.

TABLE 1

| Example # | Sample/Step | PV (cc/g) in the pore size range: | | | | UCS, Å | % Cryst. | SAR |
| --- | --- | --- | --- | --- | --- | --- | --- | --- |
| | | 0-20 Å | 20-80 Å | 20-135 Å | 20-300 Å | | | |
| Treatment with 3.5 meq of citric acid per g of zeolite: Examples 1-4 | CBV100-starting material | 0.403 | 0.026 | 0.031 | 0.039 | 24.660 | 95 | 5.1 |
| | 1-A | 0.308 | 0.030 | 0.037 | 0.047 | 24.562 | 51 | 6.99 |
| Example 1: 0.1M KOH, RT | 1-H | 0.342 | 0.096 | 0.110 | 0.121 | 24.570 | 69 | 6.6 |
| | 1-2E | 0.370 | 0.108 | 0.127 | 0.149 | 24.591 | 81 | 6.62 |
| | 1-3E | 0.293 | 0.153 | 0.184 | 0.203 | 24.466 | 60 | 6.7 |
| | 1-S | 0.169 | 0.085 | 0.156 | 0.194 | 24.247 | 48 | 6.72 |
| Example 2: 0.1M KOH, RT | 2-H | 0.346 | 0.101 | 0.116 | 0.133 | 24.570 | 68 | 6.63 |
| | 2-2E | 0.359 | 0.113 | 0.128 | 0.139 | 24.613 | 76 | 6.64 |
| | 2-3E | 0.273 | 0.169 | 0.196 | 0.214 | 24.460 | 53 | 6.62 |
| | 2-S | 0.143 | 0.096 | 0.163 | 0.2 | 24.247 | 39 | 6.62 |

TABLE 1-continued

| Example # | Sample/Step | PV (cc/g) in the pore size range: | | | | UCS, Å | % Cryst. | SAR |
|---|---|---|---|---|---|---|---|---|
| | | 0-20 Å | 20-80 Å | 20-135 Å | 20-300 Å | | | |
| Example 3: | 3-H | 0.354 | 0.074 | 0.089 | 0.099 | N/a | N/a | 6.69 |
| 0.1M NaOH, | 3-2E | 0.394 | 0.102 | 0.124 | 0.142 | 24.582 | 81 | 6.66 |
| 80 C | 3-3E | 0.341 | 0.115 | 0.15 | 0.174 | 24.502 | 72 | 6.74 |
| | 3-S | 0.183 | 0.059 | 0.139 | 0.183 | 24.251 | 57 | 6.74 |
| Example 4: | 4-H | 0.318 | 0.084 | 0.09 | 0.093 | N/a | n/a | 6.58 |
| 0.1M NaOH, | 4-2E | 0.314 | 0.089 | 0.1 | 0.112 | 24.594 | 83 | 6.62 |
| RT | 4-3E | 0.294 | 0.124 | 0.152 | 0.17 | 24.494 | 71 | 6.71 |
| | 4-S | 0.174 | 0.052 | 0.117 | 0.16 | 24.251 | 54 | 6.71 |
| Example 5: USY | Unsteamed CBV500 | 0.327 | 0.035 | 0.059 | 0.09 | 24.54 | 86 | 5.2 |
| | Steamed CBV500 | 0.248 | 0.047 | 0.091 | 0.114 | 24.252 | 74 | 5.2 |
| Example 6: Riving GD NH4Y - 2.25 Meq | Fresh | 0.256 | 0.111 | 0.12 | 0.124 | 24.498 | 72 | 6.44 |
| | Steamed | 0.199 | 0.071 | 0.141 | 0.179 | 24.237 | 58 | 6.46 |
| Example 7: Riving GD NH4Y - 2.5 Meq | Fresh | 0.251 | 0.116 | 0.127 | 0.141 | 24.489 | 69 | 6.48 |
| | Steamed | 0.174 | 0.079 | 0.143 | 0.179 | 24.236 | 52 | 6.48 |
| Example 8: Riving GD NH4Y - 2.75 Meq | Fresh | 0.266 | 0.152 | 0.158 | 0.161 | 24.468 | 67 | 6.57 |
| | Steamed | 0.182 | 0.0815 | 0.1585 | 0.2015 | 24.234 | 48 | 6.57 |
| Example 9: Riving GD NH4Y - 3 Meq | Fresh | 0.216 | 0.178 | 0.183 | 0.188 | 24.457 | 52 | 7.07 |
| | Steamed | 0.12 | 0.091 | 0.171 | 0.206 | 24.224 | 31 | 7.07 |

Conclusion from Examples 1 Through 9

Figure 4:
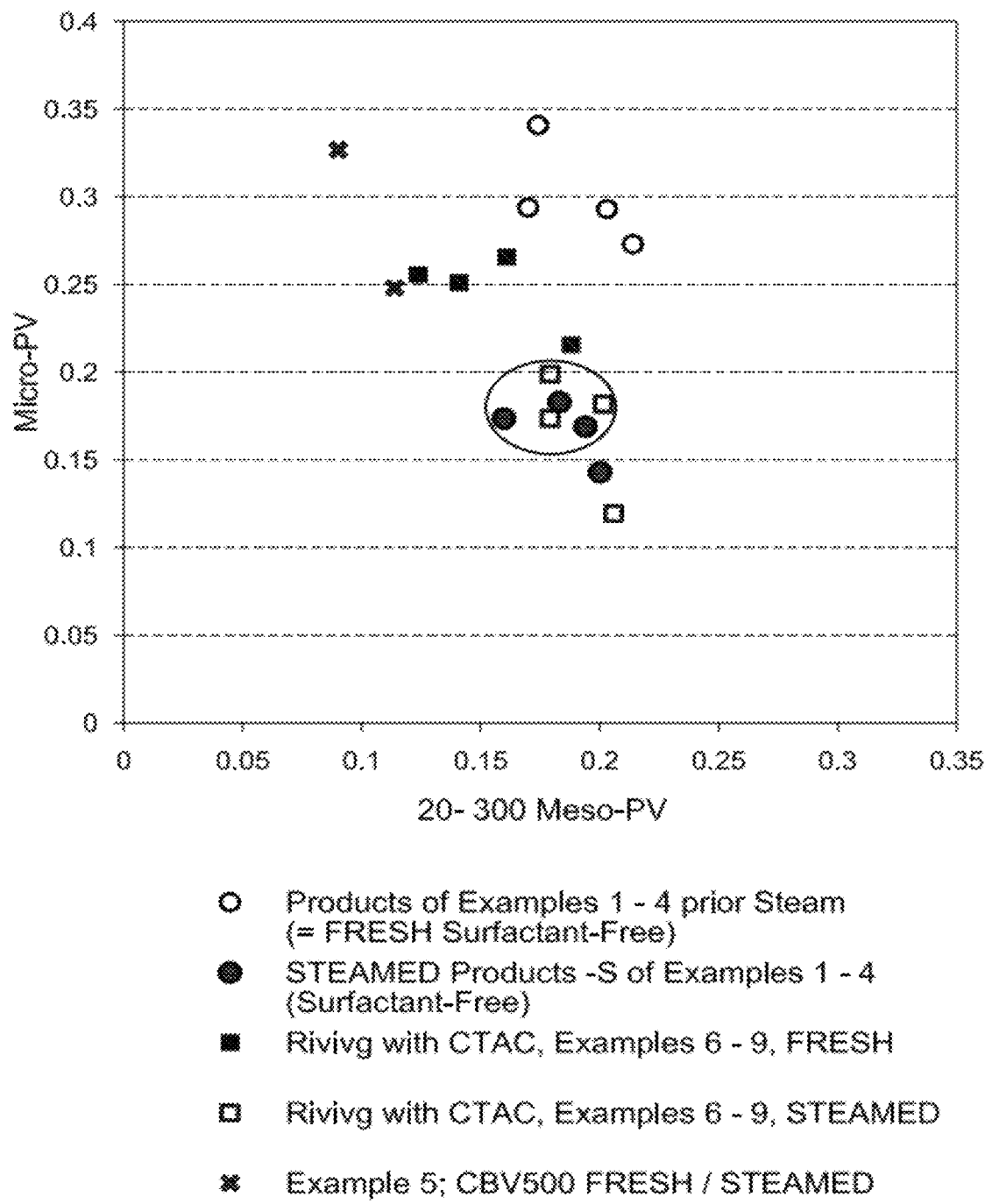
FIG. 4 is a scatter plot comparing the porosity variations in the mesoporous products prepared in Examples 1 through 9.

FIG. 4 compares the micropore and mesopore volumes for the zeolites prepared by the surfactant-free processes in Examples 1-4, the surfactant-based processes in Examples 6-9, and the regular USY before and after steaming as described in Comparative Example 5. As shown in the circled area of FIG. 4, the steamed products of the surfactant-free process have essentially the same optimal micropore and mesopore volumes as the products produced from the surfactant-based processes. Before steaming, products of the surfactant-free process demonstrate higher micropore volume numbers than those products of surfactant-based processes. Furthermore, the processes of Examples 1-4 and 6-9, which utilize a framework modification step followed by either alkali hydroxide treatment or surfactant treatment, respectively, all produce substantially increased mesopore volumes relative to the untreated zeolite in Comparative Example 5. Additionally, the FRESH (i.e., unsteamed) samples generated in Examples 1-4 using the surfactant-free process demonstrated higher micropore volumes than the FRESH products of the surfactant-driven processes of Examples 6-9.

FIGS. 5a and 5b demonstrate the cumulative pore volume for pore sizes up to 300 Å (FIG. 5a) and mesopore size distribution in the same range (FIG. 5b), both of which were calculated from Ar adsorption isotherms using the DFT method. FIGS. 5a and 5b depict DFT plots that compare the steamed products of the surfactant-free process of Example 1 and surfactant-assisted process of Example 8. As shown in FIGS. 5a and 5b, both of these products contained similar micropore and mesopore values and pore size distributions. Thus, as shown in FIGS. 5a and 5b, the surfactant-free processes can be just as effective as the surfactant-based processes in introducing mesoporosity into the zeolites.

Example 10

In this example, 150 g of CBV 300 ammonium Y zeolite (Zeolyst) were mixed with 600 g of deionized water at room temperature under agitation to form a slurry. Then, 33.6 g of citric acid (Fisher) were dissolved in 302.4 g of deionized water to form a 10% solution. This solution was slowly pumped into the agitating zeolite slurry. The velocity of the pump was adjusted to complete the admixing of the whole volume of the acid solution over a period of 90 minutes. The final pH of the subsequent mixture was 3.5. The acid-treated, framework-modified zeolite was separated in a Buchner funnel from the acid solution and washed three times with 500 ml of room temperature deionized water.

Subsequently, 28 g of NaOH were dissolved in 940 ml of water in a beaker to form an alkaline solution. The acid-treated, framework-modified zeolite was then poured into the beaker to suspend the solids in the alkaline solution. The subsequent mixture was heated at 80° C. and agitated in a water bath for 12 hours. The sample then was separated by filtration and washed three separate times with 500 ml of hot deionized water. The produced solid was then air dried overnight and analyzed by $N_2$ adsorption at 77K. The hysteresis loop on the desorption-adsorption isotherm, shown in FIG. 6, confirms that the method described herein introduces a significant amount of mesoporosity (0.14 cc/g), while preserving much of its original microporosity (0.25 cc/g).

The produced sample was also analyzed by Transmission Electron Microscopy. A representative micrograph, shown in FIG. 7, shows intracrystalline mesoporosity that was not present in the original material. This mesoporosity is observed as lighter areas inside the crystal shown in the micrograph. Crystal lattice fringes, characteristic of the zeolite structure, are also clearly observed in this micrograph as parallel lines that run in a diagonal direction. The combination of mesoporosity and crystal lattice in the same particle is a clear confirmation of the incorporation of intracrystalline mesoporosity by the method described herein.

An additional micrograph at lower magnification, as depicted in FIG. 8, has been included to prove that this method produces intracrystalline mesoporosity (observed as lighter regions inside the particles) in many, if not all, the crystals of the sample.

Example 11

In this example, 150 g of CBV 300 ammonium Y zeolite (Zeolyst) were mixed with 600 g of deionized water at room temperature under agitation to form a slurry. Then, 44.8 g of citric acid (Fisher) were dissolved in 302.4 g of deionized water to form a 10% solution. This solution was slowly pumped into the agitating zeolite slurry. The velocity of pumping was adjusted to complete the admixing of the whole volume of the acid solution over a period of 90 minutes. The final pH of the mixture was 3.5. The acid-treated, framework-modified zeolite was separated in a Buchner funnel from the solution and washed three separate times with 500 ml of room temperature deionized water.

Meanwhile, 28 g of NaOH were dissolved in 940 ml of water in a beaker to form an alkaline solution. The acid-treated, framework-modified zeolite was then poured into the beaker to suspend the solids in the alkaline solution. The subsequent mixture was heated at 80° C. and agitated in a water bath for 12 hours. The sample then was separated by filtration and washed three separate times with 500 ml of hot deionized water.

The produced solid was then air dried overnight and analyzed by $N_2$ adsorption at 77K. The hysteresis loop of its isotherm, shown in FIG. 9, confirms that the method described herein introduces a large amount of mesoporosity (0.21 cc/g), while preserving much of its original microporosity (0.18 cc/g). The more severe acid pretreatment in this example, when compared to Example 10 (44.8 g instead of 33.6 g of citric acid), caused more defects in the framework (less micropore volume), but results in a significant increase in mesoporosity (from 0.12 to 0.21 cc/g).

Example 12

In this example, the mesoporous zeolite produced by the process described herein was used for catalytic cracking.

Mesoporous Zeolite Production

To produce the mesoporous zeolite, 2300 grams of CBV 100 sodium Y zeolite (Zeolyst) (on an as-received basis) was slurried in 8000 grams of water in a stainless steel reactor. Over a period of one hour, a solution containing 515.2 g of citric acid and 4032 g of water was added to the slurry at room temperature. The resulting slurry was vacuum filtered and washed with water to produce an acid-treated filter cake.

Meanwhile, an alkaline solution was prepared by combining 138 g of 50% (by weight) NaOH solution and 17100 g of water in a jacketed stainless steel reactor. To that was added, with stirring, the acid-treated filter cake. The resultant slurry was stirred to maintain the solids in suspension and heated to 80° C. overnight to produce a mesoporous zeolite-containing slurry. Afterwards, the mesoporous zeolite-containing slurry was vacuum filtered and washed with hot (about 70° C.) water to produce a mesoporous zeolite filter cake.

Separately, 6600 grams of a $NH_4NO_3$ solution containing 520 grams of $NH_4NO_3$ was prepared by combining a 50% $NH_4NO_3$ solution and water. To that was added, with stirring, the mesoporous zeolite filter cake. The resultant slurry was heated to about 70° C. for about 30 minutes to produce an ammonium ion exchanged mesoporous zeolite slurry. The ammonium ion exchanged mesoporous zeolite slurry was vacuum filtered and washed with water to produce an ammonium ion exchanged zeolite filter cake.

Ammonium ion exchange was conducted a second time, under the same conditions described above, on the ammonium ion exchanged zeolite filter cake to yield a doubly ammonium ion exchanged mesoporous zeolite filter cake. The doubly ammonium ion exchanged mesoporous zeolite filter cake was dried at about 80° C. and the resultant material was passed through a stainless steel screen to yield a doubly ammonium ion exchanged mesoporous zeolite powder.

The doubly ammonium ion exchanged mesoporous zeolite powder was calcined for about two to three hours at a temperature of about 540° C. in a steam atmosphere to produce an ultrastable mesoporous zeolite powder.

Ammonium ion exchange was conducted two additional times, under the same conditions described above, on the ultrastable mesoporous zeolite powder to yield a low sodium, ultrastable mesoporous zeolite filter cake after vacuum filtration and washing.

A solution of $La(NO_3)_3$ was made by combining 591 grams of water and 148 grams of a $La(NO_3)_3$ solution containing 27.3% (by weight) of rare earth oxides (expressed primarily as $La_2O_3$ with a small amount of $CeO_2$). To that was added, with stirring, the low sodium, ultrastable, mesoporous zeolite filter cake and the subsequent mixture was heated to about 70° C. for about 30 minutes to produce a rare earth ion exchanged mesoporous zeolite slurry. The rare earth ion exchanged ultrastable mesoporous zeolite slurry was vacuum filtered and washed with hot water to produce a rare earth ion exchanged ultrastable mesoporous zeolite filter cake.

Mesoporous Catalyst Preparation

A spray dryer feed slurry was prepared by mixing the rare earth ion exchanged, ultrastable mesoporous zeolite filter cake with Ludox brand DVSZN002 silica sol suspension (Nalco), ASP-200 brand kaolin clay (BASF), and water such that the total solids content of the slurry was about 30%. The loss on heating to 600° C. was determined for the mesoporous zeolite, silica sol suspension, and kaolin clay prior to producing the slurry. The mesoporous zeolite, silica sol suspension, and kaolin clay, represented 55%, 22.5%, and 22.5% of the solids in the slurry, respectively. The weight percentage of solids took into account the loss of volatiles at 600° C. A small amount (about 0.25% of the clay weight) of tetrasodium pyrophosphate was added as a dispersing aid.

The spray dryer feed slurry was spray dried in a three foot diameter Bowen tower spray dryer with a #10 fountain nozzle at an atomizing air pressure of about 25 to 30 psig, an inlet air temperature of about 430° C., and an outlet air temperature of about 125° C. The resultant chamber product was a mesoporous FCC catalyst precursor. The mesoporous FCC catalyst precursor was calcined in a muffle oven at a temperature of 450° C. for about 30 minutes to produce a mesoporous FCC catalyst.

Conventional Zeolite Preparation (Comparative)

Two conventional (i.e., non-mesoporous) rare earth ion exchanged, low sodium zeolites were prepared as above, except that CBV 500 low sodium ultrastable Y zeolite (Zeolyst) was used in place of the low sodium ultrastable mesoporous zeolite. The amounts of $La(NO_3)_3$ used in the rare earth ion exchange steps were controlled to target about 2.5% and about 5% by weight, respectively, on the two conventional zeolites in order to produce a low rare earth conventional zeolite and a high rare earth conventional zeolite.

Conventional Catalyst Preparation (Comparative)

Conventional FCC catalysts were prepared as above using the low rare earth conventional zeolite and the high rare earth conventional zeolite to produce a low rare earth conventional FCC catalyst and a high rare earth conventional FCC catalyst, respectively.

Steam Deactivation

A −100 mesh/+270 mesh particle size fraction of each of the three FCC catalysts produced above was steam deactivated by calcining for eight hours at a temperature of 788° C. in a fluidizing atmosphere of 100% steam to produce a mesoporous, steam-deactivated FCC catalyst; a low rare earth, steam-deactivated conventional FCC catalyst; and a high rare earth, steam-deactivated conventional FCC catalyst.

Catalytic Testing and Results

Each of the three steam deactivated FCC catalysts were tested for catalytic cracking performance using an Advanced Catalytic Evaluation ("ACE") test unit (Kayser Technology, Inc.) and a paraffinic vacuum gasoil feed having an API gravity of about 25, a 5% boiling point of about 345° C., and a 95% boiling point of about 600° C. The reactor temperature was 527° C. and the catalyst weight was varied to achieve different catalyst/oil weight ratios of between about 3 and 9.

TABLE 2, below, compares the physical and chemical properties of the three FCC catalysts after calcination for 30 minutes at 450° C. and the zeolite UCS after steam deactivation. TABLE 2 shows that the rare earth contents and the steamed UCS of the mesoporous FCC catalyst is between those of the two conventional FCC catalysts. Consequently, this allows for the valid ranking of the respective catalytic performances of the catalysts. TABLE 2 shows that the t-plot external surface area of the mesoporous FCC catalyst was about 60 m²/gm (50% relative) higher than the conventional FCC catalysts. This is the result of the additional mesoporosity of the mesoporous zeolite in the mesoporous FCC catalyst.

TABLE 2

| FCC Catalyst Identification | Rare Earth Oxide Content, % | Sodium Content, % | Zeolite UCS, Å | Zeolite UCS After Steam Deactivation, Å | N₂ BET Surface Area, m²/gm | t-plot External Surface Area, m²/gm |
|---|---|---|---|---|---|---|
| Mesoporous | 1.91 | 0.1 | 24.48 | 24.27 | 469 | 164 |
| Low Rare Earth Conventional | 1.20 | 0.1 | 24.53 | 24.26 | 455 | 104 |
| High Rare Earth Conventional | 2.45 | 0.1 | 24.55 | 24.31 | 462 | 108 |

TABLE 3, below, compares the catalytic cracking performance of the three steam deactivated FCC catalysts at 75% conversion. The catalytic data in TABLE 3 shows that the mesoporous FCC catalyst containing the mesoporous zeolite of the present invention was intermediate in activity between the low and high rare earth conventional FCC catalysts and produced more desirable products (i.e., gasoline and LCO (light cycle oil)) and less undesirable products (i.e., coke) than both of the conventional FCC catalysts. The increased gasoline yield of the mesoporous FCC catalyst over the high rare earth conventional catalyst is particularly striking, considering that the UCS of the zeolite in the steam deactivated high rare earth conventional catalyst was 0.04 Å larger than the steam deactivated mesoporous catalyst (as it is well known that high zeolite UCS favors high gasoline yield in catalytic cracking).

TABLE 3

| Steam deactivated FCC Catalyst Identification | Cat/Oil Ratio @ 75% Conversion | Gasoline Yield, % | LCO Yield, % | Coke Yield, % |
|---|---|---|---|---|
| Mesoporous | 5.6 | 52.8 | 17.6 | 2.19 |
| Low rare earth conventional | 6.4 | 51.9 | 17.2 | 2.47 |
| High rare earth conventional | 5.0 | 52.3 | 16.8 | 2.47 |

Example 13

In this example, the effect of the acid severity used in the acid framework modification on the pore volumes ("PV") and pore-size-distribution ("PSOD") of the treated zeolite was analyzed. To examine the influence of acid severity on these properties, initial zeolites were subjected to three different acid concentrations during acid pretreatment. The amount of NaOH utilized in the subsequent alkali hydroxide treatment was maintained at similar amounts for all three test conditions in order to minimize the effect of the alkali hydroxide treatment on the results. Consequently, the three separate testing conditions are illustrated in TABLE 4 below.

TABLE 4

| Treatment | Citric Acid Concentration in Acid Treatment | NaOH Concentration in Subsequent Alkali Hydroxide Treatment |
|---|---|---|
| 1 | 2.75 meq/g | 0.8 mmole/g |
| 2 | 4.0 meq/g | 1.0 mmole/g |
| 3 | 4.5 meq/g | 1.0 mmole/g |

As shown in FIG. 10, the mesopore volume and PSOD both increased where higher acid concentrations were used for the acid treatment. As shown in FIG. 10, the higher acid concentrations (i.e., 4.0 meq/g and 4.5 meq/g) introduced noticeably more mesoporosity into the zeolites and increased the overall PSOD. Therefore, this example shows that the severity of the acid wash can be used to control mesopore volume and size in the treated zeolites.

SELECTED DEFINITIONS

It should be understood that the following is not intended to be an exclusive list of defined terms. Other definitions may be provided in the foregoing description accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "containing," "contains," and "contain" have the same open-ended meaning as "comprising," "comprises," and "comprise" provided above.

As used herein, the terms "having," "has," and "have" have the same open-ended meaning as "comprising," "comprises," and "comprise" provided above.

As used herein, the terms, "including," "include," and "included" have the same open-ended meaning as "comprising," "comprises," and "comprise" provided above.

Unless otherwise indicated, the term "mesoporous" is art-recognized and refers to a porous material comprising pores with an intermediate size, ranging anywhere from about 2 to about 50 nanometers.

The term "mesostructure" is art-recognized and refers to a structure comprising mesopores which control the architecture of the material at the mesoscopic or nanometer scale, including ordered and non-ordered mesostructured materials, as well as nanostructured materials, i.e., materials in which at least one of their dimensions is in the nanometer size range, such as nanotubes, nanorings, nanorods, nanowires, nanoslabs, and the like.

The term "mesostructured zeolites" as used herein includes all crystalline mesoporous materials, such as zeolites, aluminophosphates, gallophosphates, zincophosphates, titanophosphates, etc. Its mesostructure maybe in the form of ordered mesoporosity (e.g., MCM-41, MCM-48 or SBA-15), non-ordered mesoporosity (e.g., mesocellular foams (MCF)), or mesoscale morphology (e.g., nanorods and nanotubes). The notation zeolite[mesostructure] is used to designate the different types of mesostructured zeolites.

"Y" represents a faujasite zeolite comprising at least 1.75 moles of silicon per mole of aluminum in its crystal structure. This term also includes the different exchange ion forms of Y.

The term "zeolite" is defined as in the International Zeolite Association Constitution (Section 1.3) to include both natural and synthetic zeolites as well as molecular sieves and other microporous and mesoporous materials having related properties and/or structures. The term "zeolite" also refers to a group, or any member of a group, of structured aluminosilicate minerals comprising cations such as sodium and calcium or, less commonly, barium, beryllium, lithium, potassium, magnesium and strontium; characterized by the ratio (Al+Si):O=approximately 1:2, an open tetrahedral framework structure capable of ion exchange, and loosely held water molecules that allow reversible dehydration. The term "zeolite" also includes "zeolite-related materials" or "zeotypes" which are prepared by replacing $Si^{4+}$ or $Al^{3+}$ with other elements as in the case of aluminophosphates (e.g., MeAPO, SAPO, ElAPO, MeAPSO, and ElAPSO), gallophosphates, zincophophates, and titanosilicates.

What is claimed is:

1. A method of forming a material comprising at least one mesoporous zeolite, said method comprising:

(a) subjecting an initial zeolite to a framework modification process thereby producing a framework-modified zeolite, wherein said framework modification process comprises contacting at least a portion of said initial zeolite with an acid; and (b) forming a plurality of mesopores in at least a portion of said framework-modified zeolite thereby forming said mesoporous zeolite, wherein said forming comprises contacting at least a portion of said framework-modified zeolite with a base;

wherein said forming of step (b) is performed in the substantial absence of a surfactant, wherein said framework-modified zeolite has not been subjected to drying prior to said forming of step (b), wherein said initial zeolite is selected from the group consisting of zeolite A, faujasites, mordenite, CHA, ZSM-5, ZSM-12, ZSM-22, beta zeolite, synthetic ferrierite (ZSM-35), synthetic mordenite, and mixtures of two or more thereof, wherein said initial zeolite has a framework silicon-to-aluminum ratio ("Si/Al") of less than 30, and wherein said framework-modified zeolite has a crystalline content that is less than the crystalline content of said initial zeolite as measured by X-ray diffraction ("XRD").

2. The method of claim 1 wherein said initial zeolite has a framework Si/Al of less than 20.

3. The method of claim 1 wherein said initial zeolite has a framework Si/Al of less than 10.

4. The method of claim 1 wherein said acid has a pH of less than 4 and said acid is a dealuminating acid.

5. The method of claim 1 wherein said acid is selected from the group consisting of hydrochloric acid, sulfuric acid, nitric acid, acetic acid, sulfonic acid, oxalic acid, citric acid, ethylenediaminetetraacetic acid, tartaric acid, malic acid, glutaric acid, succinic acid, and mixtures of two or more thereof.

6. The method of claim 1 wherein said acid is present in an initial amount in the range of from about 1 to about 10 milliequivalents per gram ("meq/g") of initial zeolite.

7. The method of claim 1 wherein said contacting is performed for a time period in the range of from about 1 minute to about 4 hours and at a temperature from about room temperature to 200° C.

8. The method of claim 1 wherein said framework-modified zeolite has a framework Si/Al that is at least 1 percent greater than the framework Si/Al of said initial zeolite.

9. The method of claim 1 wherein said framework-modified zeolite has a crystalline content that is at least 5 percent less than the crystalline content of said initial zeolite as measured by XRD.

10. The method of claim 1 wherein said framework-modified zeolite has a crystalline content that is at least 15 percent less than the crystalline content of said initial zeolite as measured by XRD.

11. The method of claim 1 wherein said framework-modified zeolite has fewer Si—O—Al bonds in its zeolite framework than said initial zeolite.

12. The method of claim 1 wherein said framework-modified zeolite has a greater number of Si—OH and Al—OH terminal groups than said initial zeolite.

13. The method of claim 1 wherein said base is selected from the group consisting of ammonium hydroxide, tetraalkyl ammonium hydroxides, sodium hydroxide, potassium hydroxide, sodium carbonate, potassium carbonate, amines, and mixtures of two or more thereof.

14. The method of claim 1 wherein said step (b) increases the crystalline content of said framework-modified zeolite and said mesoporous zeolite has a crystalline content that is at least 5 percent greater than said framework-modified zeolite.

15. The method of claim 1 wherein said mesoporous zeolite has a crystalline content that is at least 60 percent of the crystalline content of said initial zeolite.

16. The method of claim 1 wherein said mesoporous zeolite has a total 20 to 80 Å diameter mesopore volume of at least 0.05 cc/g.

17. The method of claim 1 wherein said mesoporous zeolite has a total 20 to 80 Å diameter mesopore volume that is at least 20 percent greater than the 20 to 80 Å diameter mesopore volume of said initial zeolite.

18. The method of claim 1 wherein said mesoporous zeolite has a total 20 to 80 Å diameter mesopore volume that is at least 0.02 cc/g greater than the 20 to 80 Å diameter mesopore volume of said initial zeolite.

19. The method of claim 1 wherein said initial zeolite comprises a zeolite Y selected from the group consisting of USY, $NH_4Y$, NaY, a rare earth ion zeolite Y, or mixtures thereof.

20. The method of claim 1 wherein said mesoporous zeolite is subjected to one or more post-formation treatments selected from the group consisting of calcination, ion exchange, steaming, incorporation into an adsorbent, incorporation into a catalyst, re-alumination, silicon incorporation, incorporation into a membrane, and combinations thereof.

21. The method of claim 20 wherein said ion exchange is selected from the group consisting of ammonium ion exchange, rare earth ion exchange, lithium ion exchange, potassium ion exchange, calcium ion exchange, and combinations of two or more thereof.

22. The method of claim 1 wherein said mesoporous zeolite is a mesostructured zeolite.

23. A method of forming a material comprising at least one desilicated mesoporous zeolite, said method comprising:
(a) contacting an initial zeolite with an acid thereby forming an acid-pretreated zeolite; and
(b) contacting at least a portion of said acid-pretreated zeolite with a base to at least partially desilicate said acid-pretreated zeolite thereby producing said desilicated mesoporous zeolite,
wherein said initial zeolite is selected from the group consisting of zeolite A, faujasites, mordenite, CHA, ZSM-5, ZSM-12, ZSM-22, beta zeolite, synthetic ferrierite (ZSM-35), synthetic mordenite, and mixtures of two or more thereof,
wherein said contacting of step (b) is performed in the substantial absence of a surfactant,
wherein said acid-treated zeolite has not been subjected to drying prior to said contacting of step (b),
wherein said initial zeolite has a framework silicon-to-aluminum ratio ("Si/Al") of less than 30.

24. The method of claim 23 wherein said initial zeolite has a framework Si/Al of less than 10.

25. The method of claim 23 further comprising (c) subjecting at least a portion of said desilicated mesoporous zeolite to thermal treatment.

26. The method of claim 25 wherein said thermal treatment comprises contacting at least a portion of said desilicated mesoporous zeolite with steam, wherein said steam has a temperature in the range of from about 450 to about 1,000° C.

27. The method of claim 23 wherein said acid-pretreated zeolite has a framework Si/Al that is at least 10 percent greater than the framework Si/Al of said initial zeolite.

28. The method of claim 23 wherein said acid-pretreated zeolite has a crystalline content that is at least 10 percent less than the crystalline content of said initial zeolite as measured by XRD.

29. The method of claim 23 wherein said acid is selected from the group consisting of hydrochloric acid, sulfuric acid, nitric acid, acetic acid, sulfonic acid, oxalic acid, citric acid, ethylenediaminetetraacetic acid, tartaric acid, malic acid, glutaric acid, succinic acid, and mixtures of two or more thereof.

30. The method of claim 23 wherein said acid is present in an initial amount of at least 2.5 meq/g of initial zeolite.

31. The method of claim 23 wherein said acid is present in an initial amount of at least 4.0 meq/g of initial zeolite.

32. The method of claim 23 wherein said base is selected from the group consisting of ammonium hydroxide, tetraalkyl ammonium hydroxides, sodium hydroxide, potassium hydroxide, sodium carbonate, potassium carbonate, amines, and mixtures of two or more thereof.

33. The method of claim 23 wherein said mesoporous zeolite has a crystalline content that is at least 10 percent greater than said acid-pretreated zeolite.

34. The method of claim 23 wherein said mesoporous zeolite has a crystalline content that is at least 80 percent of the crystalline content of said initial zeolite.

35. The method of claim 23 wherein said desilicated mesoporous zeolite has a total 20 to 80 Å diameter mesopore volume of at least 0.1 cc/g.

36. The method of claim 23 wherein said desilicated mesoporous zeolite has a total 20 to 80 Å diameter mesopore volume that is at least 50 percent greater than the 20 to 80 Å diameter mesopore volume of said initial zeolite.

37. The method of claim 23 wherein said desilicated mesoporous zeolite has a total 20 to 80 Å diameter mesopore volume that is at least 0.05 cc/g greater than the 20 to 80 Å diameter mesopore volume of said initial zeolite.

38. The method of claim 23 wherein said initial zeolite comprises a zeolite Y selected from the group consisting of USY, $NH_4Y$, NaY, a rare earth ion zeolite Y, or mixtures thereof.

39. The method of claim 23 wherein said desilicated mesoporous zeolite is a mesostructured zeolite.

40. A method of forming a mesoporous material, said method comprising
(a) subjecting an initial zeolite to a framework modification process thereby producing a framework-modified zeolite, wherein said framework modification process comprises contacting at least a portion of said initial zeolite with an acid; and
(b) forming a plurality of mesopores in at least a portion of said framework-modified zeolite thereby forming said mesoporous material, wherein said forming comprises contacting at least a portion of said framework-modified zeolite with a base;
wherein said forming of step (b) is performed in the substantial absence of a surfactant,
wherein said framework-modified zeolite has not been subjected to drying prior to said forming of step (b),
wherein said initial zeolite is selected from the group consisting of zeolite A, faujasites, mordenite, CHA, ZSM-5, ZSM-12, ZSM-22, beta zeolite, synthetic ferrierite (ZSM-35), synthetic mordenite, and mixtures of two or more thereof, wherein said initial zeolite has a framework silicon-to-aluminum ratio ("Si/Al") of less than 30, and wherein said mesoporous material has a crystalline content that is at least 90 percent less than the crystalline content of said initial zeolite as measured by X-ray diffraction ("XRD").

41. The method of claim 40 wherein said mesoporous material has substantially no crystalline content as measured by XRD.

42. The method of claim 40 wherein said initial zeolite has a framework Si/Al of less than 10.

43. The method of claim 40 wherein said framework-modified zeolite has a framework Si/Al that is at least 20 percent greater than the framework Si/Al of said initial zeolite.

44. The method of claim 40 wherein said acid is present in an initial amount of at least 2.0 meq/g of initial zeolite.

45. The method of claim 40 wherein said acid is present in an initial amount of at least 3.5 meq/g of initial zeolite.

46. The method of claim 40 wherein said mesoporous material has a total 20 to 80 Å diameter mesopore volume of at least 0.1 cc/g.

47. The method of claim 40 wherein said mesoporous material has a total 20 to 80 Å diameter mesopore volume that is at least 40 percent greater than the 20 to 80 Å diameter mesopore volume of said initial zeolite.

48. The method of claim 40 wherein said mesoporous material has a total 20 to 80 Å diameter mesopore volume that is at least 0.1 cc/g greater than the 20 to 80 Å diameter mesopore volume of said initial zeolite.

49. The method of claim 40 wherein said initial zeolite comprises a zeolite Y selected from the group consisting of USY, $NH_4Y$, NaY, a rare earth ion zeolite Y, or mixtures thereof.

50. The method of claim 40 wherein said mesoporous material is subjected to one or more post-formation treatments selected from the group consisting of calcination, ion exchange, steaming, incorporation into an adsorbent, incorporation into a catalyst, re-alumination, silicon incorporation, incorporation into a membrane, and combinations thereof.

51. The method of claim 40 wherein said mesoporous material is a mesostructured material.

* * * * *